(12) United States Patent
Michieli et al.

(10) Patent No.: US 12,499,873 B2
(45) Date of Patent: Dec. 16, 2025

(54) METHOD FOR PERSONALISATION OF ASR MODELS

(71) Applicant: Samsung Electronics Co., Ltd., Suwon-si (KR)

(72) Inventors: Umberto Michieli, Staines (GB); Mete Ozay, Staines (GB); Edward Fish, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 18/405,666

(22) Filed: Jan. 5, 2024

(65) Prior Publication Data

US 2024/0257800 A1    Aug. 1, 2024

(30) Foreign Application Priority Data

Jan. 31, 2023 (GB) ...................................... 2301370
Apr. 17, 2023 (GB) ...................................... 2305633

(51) Int. Cl.
*G10L 15/06* (2013.01)
*G10L 15/30* (2013.01)

(52) U.S. Cl.
CPC ............ *G10L 15/063* (2013.01); *G10L 15/30* (2013.01)

(58) Field of Classification Search
CPC ....... G10L 15/063; G10L 15/30; G10L 15/07; G10L 15/16; G06N 5/01; G06N 3/045; G06N 3/0464; G06N 3/0495
See application file for complete search history.

(56) References Cited

U.S. PATENT DOCUMENTS

| | | | |
|---|---|---|---|
| 9,190,057 B2 | 11/2015 | Hoffmeister et al. | |
| 10,354,656 B2 | 7/2019 | Zhao et al. | |
| 10,964,312 B2 | 3/2021 | Barton et al. | |
| 11,398,238 B2 | 7/2022 | Kim et al. | |
| 2017/0085867 A1* | 3/2017 | Baran | B41M 3/008 |
| 2020/0234112 A1* | 7/2020 | Wang | G06N 3/08 |
| 2021/0160499 A1* | 5/2021 | Wang | H04N 19/176 |
| 2021/0203936 A1 | 7/2021 | Gish et al. | |
| 2021/0264279 A1 | 8/2021 | Esser et al. | |
| 2021/0279635 A1 | 9/2021 | Gadelrab et al. | |
| 2021/0306578 A1* | 9/2021 | Xiong | H04L 67/12 |

(Continued)

FOREIGN PATENT DOCUMENTS

| | | |
|---|---|---|
| CN | 113903347 A | 1/2022 |
| CN | 114049530 A | 2/2022 |

(Continued)

OTHER PUBLICATIONS

Graves et al., Connectionist Temporal Classification: Labelling Unsegmented Sequence Data with Recurrent Neural Networks, In Proceedings of the International Conference on Machine Learning, 369-376, 2006.

(Continued)

*Primary Examiner* — Michael Colucci
(74) *Attorney, Agent, or Firm* — Jefferson IP Law, LLP

(57) ABSTRACT

The present techniques generally relate to a computer-implemented method for personalising automatic speech recognition (ASR) or other general-purpose models using mixed precision (MP) quantization. Each model is personalised on a user device or server to a target memory budget B using user data.

15 Claims, 25 Drawing Sheets

(56) References Cited

U.S. PATENT DOCUMENTS

| | | |
|---|---|---|
| 2021/0406690 A1 | 12/2021 | Ramachandran et al. |
| 2022/0044114 A1 | 2/2022 | Sriram et al. |
| 2022/0129736 A1 | 4/2022 | Shen et al. |
| 2022/0129759 A1 | 4/2022 | Yao et al. |
| 2022/0164411 A1* | 5/2022 | Jain .................. G06F 17/16 |
| 2023/0072337 A1* | 3/2023 | Lee .................... G06F 3/06 |
| 2023/0168921 A1* | 6/2023 | Kim .................. G06F 15/80 712/220 |
| 2023/0267301 A1* | 8/2023 | El-Kurdi ............. G06N 3/04 706/27 |
| 2023/0281423 A1* | 9/2023 | Bijalwan .......... G06N 3/0495 382/156 |
| 2024/0169180 A1* | 5/2024 | Yang ................. G06N 3/063 |

FOREIGN PATENT DOCUMENTS

| | | |
|---|---|---|
| WO | 2022/080790 A1 | 4/2022 |
| WO | 2022/088063 A1 | 5/2022 |

OTHER PUBLICATIONS

Harwell, Alexa-does-not-understand-your-accent, https://www.washingtonpost.com/graphics/2018/business/alexa-does-not-understand-your-accent/; Jul. 19, 2018.

Rangarajan, Hey Siri—Why Don't You Understand More People Like Me?, https://www.motherjones.com/media/2021/02/digital-assistants-accents-english-race-google-siri-alexa/, Feb. 23, 2021.

Dee, Voice search: the latest statistics and trends for 2022 and beyond, https://www.algolia.com/blog/product/voice-search-the-latest-statistics-and-trends-for-2022-and-beyond/, 2022.

Enge, Mobile Voice Usage Trends in 2020, https://www.perficient.com/insights/research-hub/voice-usage-trends, Jun. 30, 2020.

Ravanelli et al., Speaker recognition from raw waveform with sincnet, 2018 IEEE Spoken Language Technology Workshop (SLT). IEEE, 2018.

Long et al., Fully Convolutional Networks for Semantic Segmentation, published in the Proceedings of the IEEE/CVF Computer Vision and Pattern Recognition (CVPR) conference, 2015.

Badrinarayanan et al., SegNet: A Deep Convolutional Encoder-Decoder Architecture for Image Segmentation, published in the Proceedings of the IEEE/CVF Computer Vision and Pattern Recognition (CVPR) conference, 2015.

Strudel et al., Segmenter: Transformer for Semantic Segmentation, published in the Proceedings of the IEEE/CVF International Conference on Computer Vision (ICCV), 2021.

Liu et al., Swin Transformer: Hierarchical Vision Transformer using Shifted Windows, published in the Proceedings of the IEEE/CVF International Conference on Computer Vision (ICCV), 2021.

Baevski et al., wav2vec 2.0: A framework for self-supervised learning of speech representations, published in NeurIPS, 2020.

Rahaman et al., On the Spectral Bias of Neural Networks, published in ICML, 2019.

Bernhardsson, Language Pitch, Feb. 1, 2017.

Fukushima, Cognitron: A self-organizing multilayered neural network, published in Biological Cybernetics, 20(3), 121-136, Feb. 4, 1975.

Maas et al., Rectifier nonlinearities improve neural network acoustic models, published in the International Conference on Machine Learning (ICML). vol. 30. No. 1., 2013.

Yu et al., Low-bit quantization needs good distribution, published in the Computer Vision and Pattern Recognition Worksops (CVPRW), 2020.

Gholamit et al., A survey of quantization methods for efficient neural network inference, publisehd in arXiv:2103.13630, 2021.

Stevens et al., Deep learning with PyTorch, Chapter 15, published by Manning Publications and on the Pytorch website at https://pytorch.org/docs/stable/quantization.html, 2020.

Wu et al., Easyquant: Post-training quantization via scale optimization, published in NeurIPS, 2020.

Yuan et al., Ptq4vit: Post-training quantization for vision transformers with twin uniform quantization, published in Springer, pp. 191 to 207, 2022.

Panayotov et al., Librispeech: An asr corpus based on public domain audio books, published in ICASSP, 2015.

Conneau et al., Fleurs: Few-shot learning evaluation of universal representations of speech, published in Spoken Language Technologies (SLT), 2022.

Radford et al., Robust speech recognition via large-scale weak supervision, published in arXiv:2212.04356, 2022.

Warden et al., Speech commands: A dataset for limited-vocabulary speech recognition, published in arXiv:1804.03209, 2018.

Dong et al., Hawq: Hessian aware quantization of neural networks with mixed-precision, published in ICCV, 2019.

Wang et al., FAIRSEQ S2t: Fast speech to text modelling with FAIRSEQ, published in AACL, 2020.

Liu et al., Post-training quantization for vision transformer, published in NeurIPS, 2021.

Eryilmaz et al., Understanding how orthogonality of parameters improves quantization of neural networks, published in IEEE TNNLS, 2022.

Chen et al., Towards Mixed-Precision Quantization of Neural Networks via Constrained Optimization, Oct. 13, 2021.

Gao et al., Extremely Low Footprint End-to-End ASR System for Smart Device, Jul. 7, 2021.

Yuan et al., PTQ4ViT: Post-Training Quantization for Vision Transformers with Twin Uniform Quantization, Jul. 27, 2022.

Yao et al., HAWQ-V3: Dyadic Neural Network Quantization, Jun. 23, 2021.

Tsuji et al., GPQ: Greedy Partial Quantization of Convolutional Neural Networks Inspired by Submodular Optimization, 2020.

Combined Search and Examination Report, dated Feb. 13, 2024, issued in Great Britain Application No. GB2305633.6.

* cited by examiner

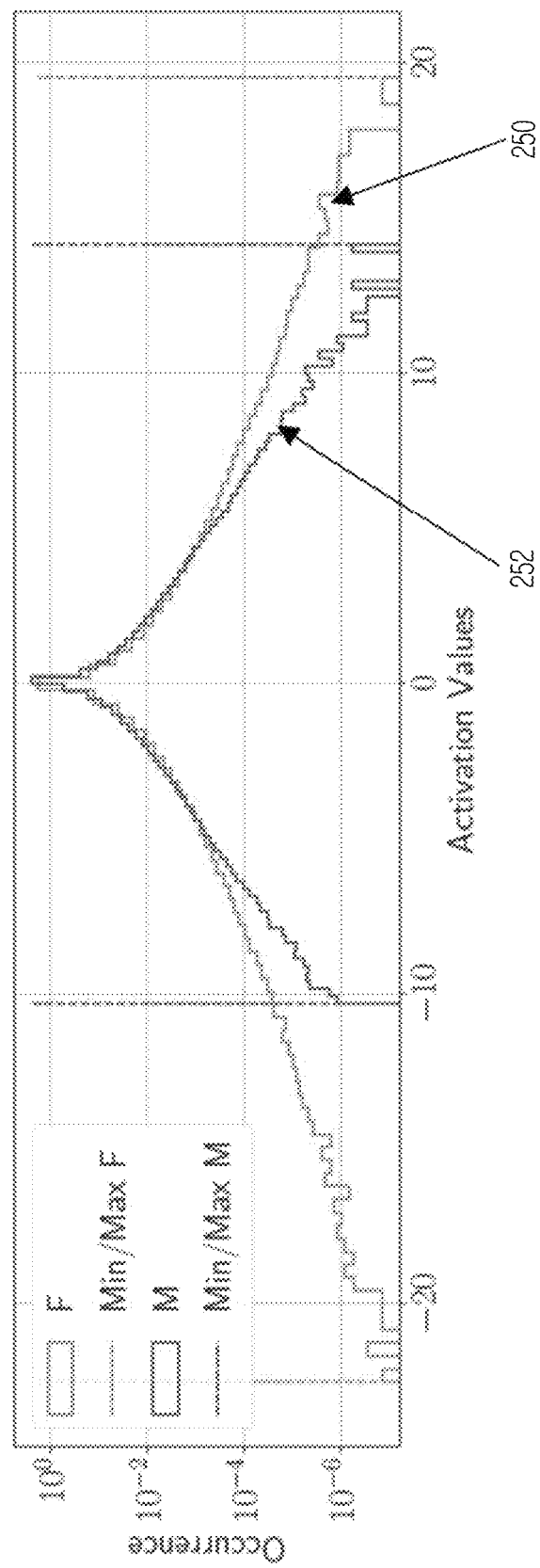

FIG. 4A

Algorithm 1: Sensitivity detection of myQASR.

Data: $B$ memory budget in MB, $M$ model size in MB ($M > B$), and $\mathcal{W}$ model parameters.
Result: Array b of selected bit depths
$\mathbf{b} \leftarrow \{32, \ldots, 32\}$  // *initialize to FP*
Compute median activations a over $\mathcal{U}$ ($a_l, \forall l \in [L]$);
$\hat{\mathbf{q}} \leftarrow \text{argsort}(\mathbf{a})$  // *get sorted list of layer indexes*
while $M > B$ do
    for $l$ *in* $\hat{q}$ do
        $b_l \mathrel{-}= 1$  // *reduce l-th layer bit depth by one*
        $M = \text{ComputeModelSize}(\mathbf{b}, \mathcal{W})$
        if $M <= B$ then return *bit depth array* b ;

def ComputeModelSize($\mathbf{b}, \mathcal{W}$):
    $\forall (b_l, W_l)$ in $(\mathbf{b}, \mathcal{W})$: qParams += $(b_l / 8) \times |W_l|$
return qParams $/ 1024^2$  // *model size in MB*

FIG. 8

| Language Test | ca | de | en | fr | ja | ko | nl | pl | pt | ru | No Calib |
|---|---|---|---|---|---|---|---|---|---|---|---|
| ca | 9.00 | 8.78 | 9.12 | 9.14 | 8.59 | 9.10 | 8.76 | 9.34 | 8.74 | 9.27 | 30.00 |
| de | 17.38 | 17.19 | 17.10 | 17.65 | 17.36 | 17.19 | 17.74 | 17.74 | 17.38 | 17.31 | 46.50 |
| en | 12.52 | 12.45 | 11.60 | 12.78 | 12.45 | 12.52 | 12.65 | 12.52 | 12.35 | 12.29 | 75.46 |
| fr | 11.85 | 11.61 | 11.93 | 11.00 | 11.19 | 11.96 | 11.93 | 11.13 | 11.10 | 12.53 | 40.95 |
| ja | 14.80 | 14.40 | 15.15 | 15.00 | 14.55 | 15.18 | 14.83 | 15.11 | 15.30 | 14.90 | 30.56 |
| ko | 19.28 | 19.46 | 21.53 | 19.73 | 19.73 | 19.12 | 19.37 | 21.08 | 20.81 | 19.04 | 25.58 |
| nl | 11.70 | 11.87 | 11.81 | 11.23 | 12.16 | 11.87 | 10.99 | 12.46 | 11.64 | 11.87 | 24.27 |
| pl | 12.79 | 12.61 | 13.47 | 13.40 | 12.54 | 12.93 | 12.97 | 12.61 | 12.82 | 12.01 | 32.67 |
| pt | 10.19 | 9.91 | 9.98 | 9.89 | 9.98 | 10.14 | 10.37 | 9.98 | 10.00 | 9.96 | 37.08 |
| ru | 9.62 | 9.55 | 9.62 | 10.09 | 9.42 | 9.35 | 9.96 | 10.12 | 10.49 | 9.72 | 30.28 |

Language Calibration

| Reduction | Male | | Female | | Distance | Male | | Female | |
|---|---|---|---|---|---|---|---|---|---|
| | WER | CER | WER | CER | | WER | CER | WER | CER |
| Avg | 7.5 | 2.4 | 7.3 | 2.3 | L1 [20] | 7.3 | 2.3 | 7.2 | 2.2 |
| Median (ours) | 6.6 | 2.1 | 7.1 | 2.2 | L2 [20] | 7.2 | 2.2 | 7.2 | 2.2 |
| Max | 7.1 | 2.2 | 7.8 | 2.4 | SN [12] | 7.3 | 2.3 | 7.3 | 2.2 |
| Max Abs | 7.2 | 2.3 | 8.4 | 2.7 | Frob [34] | 7.3 | 2.3 | 7.2 | 2.2 |
| Std | 7.5 | 2.4 | 7.4 | 2.3 | KL [20] | 7.3 | 2.3 | 8.4 | 2.7 |

FIG. 11

|  | Male | | | Female | | |
| --- | --- | --- | --- | --- | --- | --- |
|  | WER | CER | Time | WER | CER | Time |
| None | 87.5 | 67.2 | 0 | 66.2 | 83.0 | 0 |
| L1 [20] | 8.2 | 2.7 | 158 | 9.8 | 2.8 | 147 |
| L2 [20] | 63.7 | 3.4 | 155 | 57.5 | 29.4 | 156 |
| LinW L2 [20] | 89.5 | 62.9 | 154 | 92.2 | 70.2 | 155 |
| SqW L2 [20] | 94.7 | 81.0 | 154 | 97.1 | 82.9 | 155 |
| myQASR | 28.8 | 28.7 | 7 | 22.7 | 22.6 | 7 |
| myQASR-Hess | 7.9 | 2.5 | 161 | 7.9 | 2.4 | 154 |
| myQASR-Cosine | 6.6 | 2.1 | 172 | 7.1 | 2.2 | 171 |

FIG. 12

| $|U|$ | 4 | 8 | 16 | 32 | 64 | 128 |
|---|---|---|---|---|---|---|
| WER (M) | 6.1±2.0 | 7.0±0.4 | 6.9±0.8 | 6.6±0.1 | 8.4±0.8 | 8.5±1.4 |
| WER (F) | 7.1±1.6 | 7.0±1.0 | 6.6±1.0 | 7.1±0.2 | 6.9±0.8 | 6.8±0.5 |

FIG. 13

|          | Male |     |     |     |     |     |     | Female |     |     |     |     |     |     |
|----------|------|-----|-----|-----|-----|-----|-----|--------|-----|-----|-----|-----|-----|-----|
| Act bits | 4    | 6   | 8   | 10  | 12  | 16  | 32  | 4      | 6   | 8   | 10  | 12  | 16  | 32  |
| WER      | 69.0 | 8.1 | 6.6 | 7.0 | 7.0 | 7.1 | 7.1 | 70.0 | 8.5 | 7.1 | 7.5 | 7.4 | 7.4 | 7.4 |
| CER      | 34.7 | 2.7 | 2.2 | 2.2 | 2.2 | 2.1 | 2.1 | 3.6 | 2.7 | 1.9 | 2.3 | 2.3 | 2.3 | 2.3 |

METHOD FOR PERSONALISATION OF ASR MODELS

CROSS-REFERENCE TO RELATED APPLICATION

This application is based on and claims priority under 35 U.S.C. § 119(a) of a United Kingdom Application number 2301370.9, filed on Jan. 31, 2023 and a United Kingdom Patent Application number 2305633.6, filled on Apr. 17, 2023 in the United Kingdom Property Office, the disclosure of which is incorporated by reference herein in its entirety.

BACKGROUND

1. Field

The present application generally relates to a method for personalisation of machine learning, ML, models, for example an automatic speech recognition (ASR) model. In particular, the present application relates to a computer-implemented method for using quantization in the personalization process.

2. Description of Related Art

Recent advancement in Automatic Speech Recognition (ASR) has produced large AI models, which become impractical for deployment in mobile devices. Automatic Speech Recognition (ASR) models improve user experience when interacting with mobile devices while widening accessibility of technology. Recent innovation in ASR has focused on large and multi-purpose (e.g., multi-lingual) transformer-based architectures. However, there has been less consideration on how these models can be effectively compressed and deployed for a diverse range of users and devices, whilst preserving privacy (i.e., with anonymized data).

Model quantization is effective to produce compressed general-purpose models. However, such models are generally only used on a restricted sub-domain of interest. Model quantization can be divided into three main categories. The first is Quantization Aware Training (QAT) where labelled data is used to fine-tune a quantized model to recover accuracy. The second is Post-Training Quantization (PTQ) where labelled data is used to calibrate quantization parameters without training. The third is Data-Free PTQ (DF-PTQ) where data is unlabelled (i.e., label-free) or not available at all.

DF-PTQ has been tackled in the computer vision (CV) domain via layerwise knowledge distillation (KD) between original and quantized layers for compressing CNNs and transformer networks. In a deployed scenario, computational and time expensive KD methods are not practical as a copy of the full precision (FP) network is required. Other data-free methods use statistics of input data to generate synthetic data used to fine-tune quantized models. However, these methods cannot account for out-of-domain data which occur in deployment setups and require further training.

Therefore, the present applicant has recognised the need for improvements in personalisation of AI models when using quantization, particularly but not exclusively in automatic speech recognition, ASR, models.

SUMMARY

In a first approach of the present techniques, there is provided a computer-implemented method for personalising a machine learning, ML, model, the method comprising: obtaining a pre-trained general ML model in the form of a neural network comprising a plurality of layers with each layer having a set of general weights; obtaining a memory budget for a user device which is to store the local ML model; obtaining a set of local data samples; for each layer in the plurality of layers of the general ML model: detecting a sensitivity of the layer to quantization by applying the general ML model to the set of local data samples; determining, using the detected sensitivity of the layer to quantization and the obtained memory budget, an optimum bit depth for the corresponding layer in the local ML model, whereby the local ML model satisfies the memory budget; defining at least one scaling factor for the layer to scale the set of general weights to the optimum bit depth; and generating a set of quantized weights by quantizing the set of general weights for the layer using the at least one scaling factor; wherein the set of quantized weights for each layer define the personalised local ML model and wherein there are multiple optimum bit depths which satisfy a uniformity constraint. The uniformity constraint ensures that a difference between values of the multiple optimum bit depths is set to a fixed number, e.g. one, two or four.

The pre-trained general ML model may be obtained from a data store and/or may be a general model which has been trained to full precision by the server on data which is accessible by the server. The local ML model with the sets of quantized weights is thus a compressed version of the general ML model which requires a lower memory storage than the memory budget. The memory budget may be obtained by an input from the user or by analysis of the user device. The memory budget is typically much smaller than the original size of the general-purpose model and the quantization gain may be between twice to ten-times. The memory budget for the local ML model is between a tenth to a half of a memory storage required to store the general ML model. In other words, the local ML model is between 2 and 10 times smaller than the original, general ML model. Merely as examples, the method may be used to compress the "Wav2Vec2-Base" from 360 Mb to between 50 and 90 Mb, "Wav2Vec2-Large" from 1.4 Gb to between 100 and 250 Mb and "Wav2Vec2-Large-Conformer" from 2.4 Gb to around 375 Mb.

The method described above may be carried out on a user device to provide on-device personalisation. The set of local data samples may be stored in a database on the user device and hence obtained from the database on the user device when carrying out the steps of the method on a user device. This helps ensure privacy of the user data. Alternatively, the set of local data samples may be obtained from a remote depository, e.g. from the cloud or from a server.

Alternatively, the method described above may be carried out on the server (or other device) which has trained the general ML model and is remote from the user device on which the personalised model is to be used. In this case, the set of local data samples may be obtained from the user device. The communication bandwidth required to transmit the set of local data sample may be smaller than the bandwidth required to transfer the general ML model from the server to the user device.

Regardless of whether the method is carried out on the user device or the server, the local data samples are typically unlabelled which further enhances privacy. The set of local data samples may be a relatively small dataset (for example fewer than 32 samples).

The general ML model may be an automatic speech recognition model and the set of local data samples may comprise audio data samples. The audio data samples may be considered to form an audio profile for the user device. No feedback is required from the user when generating the local ML model.

Detecting the sensitivity of the layer to quantization may comprise detecting activation of each layer and calculating, using the detected activation, a statistic which is indicative of the sensitivity of the layer to quantization. The statistic may be selected from average, median, max, max of the absolute and standard deviation. As an alternative to calculating a statistic, a distance measure such as L1, L2, KL divergence, Spectral Norm and Frobenius norm may be calculated. The median is the preferred statistic. The median is calculated using the standard formula. When the local data samples comprise audio data samples, the statistic may be considered to be a frequency statistic because different layers are sensitive to different frequencies and hence have different sensitivity to quantization.

As set out above, there are multiple optimum bit depths and thus the local model may be termed a mixed precision quantization model. Determining the optimum bit depth may comprise ranking each layer using the calculated statistic for each layer and assigning lower optimum bit depths to lower ranked layers. This ensures that the performance loss is minimised when compressing the model to meet the memory budget. Determining the optimum bit depth may be an iterative process. The method may comprise reducing a bit depth of a first layer in the plurality of layers, calculating a size of the local ML model with the reduced bit depth; comparing the calculated size with the memory budget, when the calculated size exceeds the memory budget, reducing a bit depth of a subsequent layer in the plurality of layers and repeating the calculating, comparing and reducing a bit depth of a subsequent layer until the calculated size meets the memory budget. The first layer may be the lowest ranked layer and a subsequent layer is a layer which is ranked higher in the ranking. The bit depth may be reduced by one bit at each reducing step. When all layers have been reduced by one bit, the process loops back to the reducing of the first ranked layer and then repeats the other steps.

Generating a set of quantized weights may comprise using a quantization function to restrict the general weights to finite integer values by scaling, using the scaling factor and rounding. An example quantization function for each layer l is defined as:

$$Q(\theta_l, b_l) = [\text{round}(\theta_l/S_l) - Z_l]_{b_l}$$

where round(•) is the integer rounding operation, $Z_l$ corrects the zero point of the quantized output, $[\bullet]_{b_l}$ is the representation of • with $b_l$ bits, $\theta_l \in \{W_l, X_l\}$ is the set of weights and inputs for the general (i.e. full precision) model and $S_l$ is the scaling factor for each layer.

There may be one scaling factor which may be defined using minimum and maximum activation values for each layer. The method may comprise detecting minimum and maximum values activation of each layer when applying the general ML model to the set of local data samples; and defining a scaling factor for each layer using a difference between the minimum and maximum values activation of each layer. For example, the scaling factor $S_l$ for each layer may be defined by $$S_l = (X_l^M - X_l^m)/(2^{b_l - 1})$$

where $X_l^m$ is the minimum activation value for each layer of the full precision model, $X_l^M$ is the maximum activation value for each layer of the full precision model, and $b_l$ is the number of bits in the layer.

There may be one scaling factor which may be determined from a range of values for the scaling factor which are defined by minimum and maximum values given by the number of bits $b_l$ in a layer. The scaling factor may be defined by minimizing a distance between a quantized output from each layer of the local ML model and an output from the corresponding layer in the general ML model when using a calibration data set. The quantized output from each layer may be defined by $$\hat{o}_l = Q(W_l, b_l)^T Q(o_{l-1}, b_l).$$

where Q is the quantization function, $o_l$ is the output vector for each layer L of the general model, $W_l$ is the set of weights for each layer l of the general model and $b_l$ is the number of bits in the layer. The output may be determined using a calibration data set and thus there is a calibration step.

There may be two scaling factors per layer. The two scaling factors may be defined using two quantization ranges per layer. The quantization ranges per layer, $R_1^l$ and $R_2^l$ may be defined by $$R_1^l = \left[-2^{k-1} S_{R_1^l}, 0\right] \text{ and } R_2^l = \left[0, -2^{k-1} S_{R_2^l}\right]$$

where $S_{R_1^l}$ and $S_{R_2^l}$ are the scaling factors for each quantization range for each layer and k is the current user with k=1, 2, . . . , K.

Defining the two scaling factors may comprise performing a linear search, for example to search for optimum scaling factors which minimize a distance between a quantized output from each layer of the local ML model when using a calibration data set and an output from the corresponding layer in the general ML model when using a calibration data set. When performing the search, there may be scaling using a loss function. A Hessian-based calibration optimization may be used in the linear search. In other words, the method may comprise calibrating using a calibration data set. The calibration data set may be the set of local data samples and the two phrases may be used interchangeably.

Defining the two scaling factors may comprise using a cosine distance. The cosine distance may be defined as:

$$\min_{S_{R_1^l}, S_{R_2^l}} \mathbb{E}_\mathcal{U} \left[\frac{\hat{o}_l \cdot o_l}{\|\hat{o}_l\| \cdot \|o_l\|}\right].$$

where $S_{R_1^l}$ and $S_{R_2^l}$ are the two scaling factors (one for each quantization range $R_1$ and $R_2$), $o_l$ is the output vector for each layer L of the general model, $\hat{o}_l$ is the output vector for each layer L of the local model and $\mathbb{E}_\mathcal{U}$ is the expectation computed over the calibration data set. Defining the two scaling factors may thus comprise using a cosine distance between a quantized output from each layer of the local ML model when using a calibration data set and an output from the corresponding layer in the general ML model when using the calibration data set.

In a related approach of the present techniques, there is provided a computer-implemented method for applying the personalized machine learning model to a new input received by the user device. The method may comprise obtaining, at the user device, input speech; processing the input speech using the personalised model generated as described above to determine a command from a user and implementing the command on the user device. Alternatively, the processing may generate a text output from the input speech.

In a related approach of the present techniques there is a computer-implemented method for processing an input image on a client device, the method comprising: receiving, from the server, a personalised model which has been generated as described above and wherein the personalised model is for image processing; obtaining, at the client device, an input image; processing the input image using the personalised model to generate a processed image in the form of a segmentation map by separating the input image into a plurality of semantically consistent segments. The processed image (i.e. the segmentation map) may then be output. The model data may comprise a ML model in the form of a segmentation model which generates a segmentation map divides the input image into a plurality of segments (or segmented regions). Examples of segmentation models which may be trained as described above are described for example in "Fully Convolutional Networks for Semantic Segmentation" by Long et al. published in the Proceedings of the IEEE/CVF Computer Vision and Pattern Recognition (CVPR) conference (2015) or "Segnet: A Deep Convolutional Encoder-Decoder Architecture for Image Segmentation" by Badrinarayanan et al. published in the Proceedings of the IEEE/CVF Computer Vision and Pattern Recognition (CVPR) conference (2015). Alternatively, segmentation may be done using transformers, e.g. as described in "Segmenter: Transformer for Semantic Segmentation" by Strudel et al. published in the Proceedings of the IEEE/CVF International Conference on Computer Vision (ICCV) 2021 or "Swin Transformer: Hierarchical Vision Transformer using Shifted Windows" by Liu et al. published in the Proceedings of the IEEE/CVF International Conference on Computer Vision (ICCV) 2021. For example, a segmentation model may be used to generate the segmentation map.

The method may further comprise selecting at least one segment from the plurality of semantically consistent segments. In this case, the personalised model may further comprise a ML model in the form of a recommendation model which automatically selects the at least one segment or the selection may be done by a user. Both the recommendation model and/or the segmentation model may have been personalised as described above. The personalisation of the recommendation model should also result in an improved user experience when editing an input image because the recommendation model is more likely to automatically select a segment which a user has previously edited in similar photos.

The method may comprise further processing the input image by applying at least one of the following: erasing the at least one selected segment, applying a filter to the at least one selected segment, and providing a tag for the at least one selected segment to be output with the processed image. Such processing may be done using any suitable application and may be integrated with photo storage applications (e.g. Samsung Photo Gallery, Samsung stories) on a user device. For example, the tag represents a class or label, e.g. dog, cat, people, which shows regions of the image whose pixels belong to the semantic class indicated by the label. The classes may be pre-determined and may be fine-tuned (i.e. increased in number or otherwise updated) by the training.

In a related approach of the present techniques there is a computer-implemented method for processing speech on a client device, the method comprising: receiving, from the server, a personalised model which has been generated as described above, wherein the personalised model is for classifying text; obtaining, at the client device, input text; and processing the input text using the personalised model to generate a classification.

In a related approach of the present techniques, there is provided a computer-readable storage medium comprising instructions which, when executed by a processor, causes the processor to carry out any of the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

In a related approach of the present techniques, there is provided a system for customising a machine learning model, the system comprising: a server comprising: a processor for training a general machine learning model to learn a set of general parameters (or weights); and an electronic user device comprising: memory for storing a local ML machine derived from the general machine learning model which is received from the server, and at least one processor coupled to memory. The processor is arranged to receive at least one training set comprising a plurality of training samples. The processor may be further arranged (or configured) to carry out any of the steps of the method described above to personalise the general ML model.

In a related approach of the present techniques, there is provided a user device for generating a personalised local machine learning, ML, model, wherein the user device is configured to: obtain, from a server, a pre-trained general ML model in the form of a neural network comprising a plurality of layers with each layer having a set of general weights; obtain a memory budget for the local ML model; obtain a set of local data samples; and for each layer in the plurality of layers of the general ML model: detect, using a sensitivity module, a sensitivity of the layer to quantization by applying the general ML model to the set of local data samples; determine, using the detected sensitivity of the layer and the obtained memory budget, an optimum bit depth for the corresponding layer in the local ML model, so that the local ML model satisfies the memory budget; define at least one scaling factor for the layer to scale the set of general weights to the optimum bit depth; and generate, using a quantization module, a set of quantized weights by quantizing the set of general weights for the layer using the at least one scaling factor. The set of quantized weights for each layer define the personalised local ML model, and there are multiple optimum bit depths which satisfy a uniformity constraint.

In a related approach of the present techniques, there is provided a server for generating a personalised local machine learning, ML, model to be stored on a user device, wherein the server is configured to: pre-train a general ML model in the form of a neural network comprising a plurality of layers with each layer having a set of general weights; obtain a memory budget for user device which is to store the local ML model; obtain, from the user device, a set of local data samples; and for each layer in the plurality of layers of the general ML model: detect, using a sensitivity module, a sensitivity of the layer by applying the general ML model to the set of local data samples; determine, using the detected sensitivity of the layer and the obtained memory budget, an optimum bit depth for the corresponding layer in the local ML model, so that the local ML model satisfies the memory budget; define at least one scaling factor for the layer to scale the set of general weights to the optimum bit depth; and generate, using a quantization module, a set of quantized weights by quantizing the set of general weights for the layer using the at least one scaling factor. The set of quantized weights for each layer define the personalised local ML model, and there are multiple optimum bit depths which satisfy a uniformity constraint. The server outputs the personalised local ML model to the user device for storage thereon.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general-purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

The methods described above may be wholly or partly performed on an apparatus, i.e., an electronic device, using a machine learning or artificial intelligence model. The model may be processed by an artificial intelligence-dedicated processor designed in a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

As mentioned above, the present techniques may be implemented using an AI model. A function associated with AI may be performed through the non-volatile memory, the volatile memory, and the processor. The processor may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

BRIEF DESCRIPTION OF THE DRAWINGS

Implementations of the present techniques will now be described, by way of example only, with reference to the accompanying drawings, in which:

FIG. 2f is a graph which plots the occurrence of an activation value for both a female voice and a male voice;

FIG. 4a shows an example algorithm for the evaluation of the sensitivity of each layer as required in FIG. 3;

FIG. 4b is a flowchart for the evaluation method of FIG. 4a;

FIGS. 5a to 5c show changes in bit depth for example models when implementing the algorithm of FIG. 4a;

FIG. 8 is a table showing results for a Whisper-L model has been compressed in multi-lingual settings (Catalan, German, English, French, Japanese, Korean, Dutch, Polish, Portuguese and Russian) which using the method of FIG. 3

FIG. 9 is a table showing accuracy (ACC) for a W2V2-Large-Conformer model which has been compressed for multiple speakers using the method of FIG. 3;

FIG. 10 is a table showing word and character error rate (WER, CER) when using different statistics or distance measures to determine sensitivity in the method of FIG. 3;

FIG. 11 is a table showing word and character error rate (WER, CER) and time (sec) when comparing the different methods of FIG. 3 with known methods;

FIG. 12 is a table showing word error rate (WER) for different number of calibration data samples in the method of FIG. 3;

FIG. 13 is a table showing word and character error rate (WER, CER) for quantization of activations to different bit depths;

DETAILED DESCRIPTION OF DRAWINGS

Broadly speaking, the present techniques generally relate to a computer-implemented method for personalising general-purpose models using mixed precision (MP) quantization. As an example, the model may be automatic speech recognition (ASR) which involves the recognition and translation of spoken language into text by computers. Other examples of speech technologies which use a speech/audio model which has been trained with speech/audio data include for example speaker verification (SV), speaker identification (SI), keyword spotting (KWS), speech enhancement, speaker diarization, speech translation, sound source separation and audio event detection. The personalisation may also apply to models for processing images and/or videos as described below.

Figure 1:
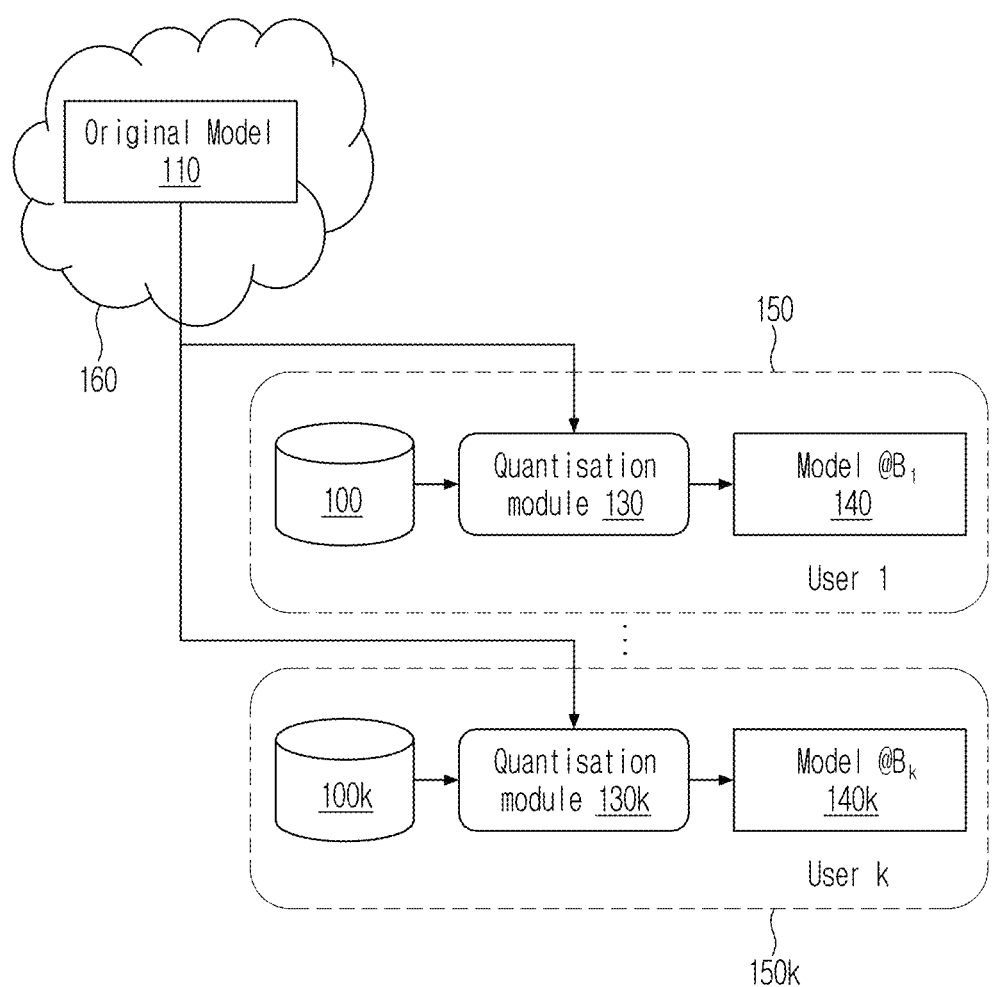
FIG. 1 is a schematic diagram showing personalisation of an original model to multiple user devices.

FIG. 1 is a schematic illustration of the present techniques. A general-purpose model 110 is stored centrally, e.g. on the cloud 160 or in a remote server. Such a general-purpose model can be trained centrally at the server side at full precision. Typically such models are very large. The general-purpose model may be any speech model which receives raw speech data as an input and outputs an embedded representation of the input speech data. Such models can be used for many tasks such as ASR, keyword spotting and spoken-language understanding. Some indicative sizes of known models are "Wav2Vec2-Base" is 360 Mb, "Wav2Vec2-Large" is 1.4 Gb, "Wav2Vec2-Large-Conformer" is 2.4 Gb, "Hubert-Base" is 380 Mb, "Hubert-Large" is 1.4 Gb, "Hubert-XLarge" is 3.9 Gb and "EMFormer-Base" is 310 Mb. The typical ranges are between 50 Mb to 5 Gb. Merely as an example, the various "Wav2Vec2" models are described in "wav2vec 2.0: A framework for self-supervised learning of speech representations" by Baevski et al published in NeurIPS in 2020. Wav2vec2-base is formed by seven 1D convolutional layers followed by 12 attention heads. Overall, the attention heads account for 96% of the total model parameters, while the convolutional layers only account for 4% of the total number of parameters. Even more unbalanced is the case of Wav2Vec2-Large.

The general-purpose model may be a text model which receives text data as an input and outputs an embedded representation of the input text data. Such models may be used in downstream tasks such as sentiment classification and text classification. Some indicative sizes of known models are "ELMo" is 380 Mb, "BERT-Base" is 540 Mb, "BERT-Large" is 1.5 Gb, "GPT-2" is 1.5 Gb, "GPT-3-Medium" is 1.8 Gb, "Chat-GPT" is 510 Mb, "BLOOM" is 5 Gb and "Megatron" is 41 Gb. The general-purpose model may be a vision model which receives image data as an input and outputs an embedded representation of the input image data. Such models may be used in downstream tasks such as image classification, image tagging, semantic/panoptic/instance segmentation, trajectory estimation and identifying image region of interest. Some indicative sizes of known models are "Resnet" is 110 Mb, "ResNet101" is 185 Mb, "ResNet152" is 250 Mb, "VGG-16" is 60 Mb, "ViT-Basepatch16" is 350 Mb, "ViT-Large-patch14" is 1.7 Gb, "Swin-Base" is 450 Mb and "Swin-Large" is 850 Mb.

The general purpose model 110 is personalised for a user device 150, 150k for a corresponding user. For ease, just two users devices are shown but there are k users where k∈[K]. The general purpose model 110 is quantized using a quantization module 130, 130k on each user device. The personalisation is performed using a relatively small dataset of unlabelled private user samples $\mathcal{U}_k$ which may be stored in a database 100, 100k on the user device as shown or may be stored remotely. The use of unlabelled data helps to preserve the privacy of the user when personalising the model.

Each user device has a target storage budget in mega bytes (MB) which is shown as Bk. The target budget is typically much smaller than the original size of the general-purpose model and the quantization gain may be between twice to ten-times. In other words, the quantized model is between 2 and 10 times smaller than the original model. For example, the results below compress the "Wav2Vec2-Base" from 360 Mb to between 50 and 90 Mb, "Wav2Vec2-Large" from 1.4 Gb to between 100 and 250 Mb, "Wav2Vec2-Large-Conformer" from 2.4 Gb to around 375 Mb.

As explained in more detail below, using $\mathcal{U}_k$, and the quantization module 130, 130k, a personalised local model 140, 140k is generated by finding a good approximation of weight sensitivity to quantization by observing the median values of FP activations. In the example of FIG. 1, the general purpose model 110 is quantized using a quantization module 130, 130k on each user device but it will be appreciated that the quantization may also be carried out on the server as described in more detail below. Each personalised model 140, 140k may be used by the user for on-device inference, e.g. in voice assistant systems such as Bixby™ for a personalised ASR model. Personalised compression enables compression of models exclusively for different users and applications. The personalised compressed model is stored locally on the user device and hence used locally. This provides benefits such as privacy protection, low latency and will enable higher efficiency, memory management and power management on the user device. The compression strategy can also be replicated for multiple user devices to generate multiple local models for one user. Moreover, if the profile of the user changes (e.g. frequency), the compression method can adapt to match the size and accuracy performance.

In other words, the present techniques provide personalised model compression given on-device unlabelled datasets for an on-device inference, e.g. automatic speech recognition. The proposed method compresses the general-purpose model to perform a better model for the targeted final user. It is noted that quantization has been used previously but current compression and/or quantization methods do not use user-related data recordings to personalise the compressed model to work best for the final user. Thus, in known techniques, the final model is not optimized for the generic user and typical quantization functions require the whole training data for calibration. The final model is typically biased to certain categories of users which leads to a fairness problem and reduced quality and/or a reduced experience for some users.

Figure 2A:
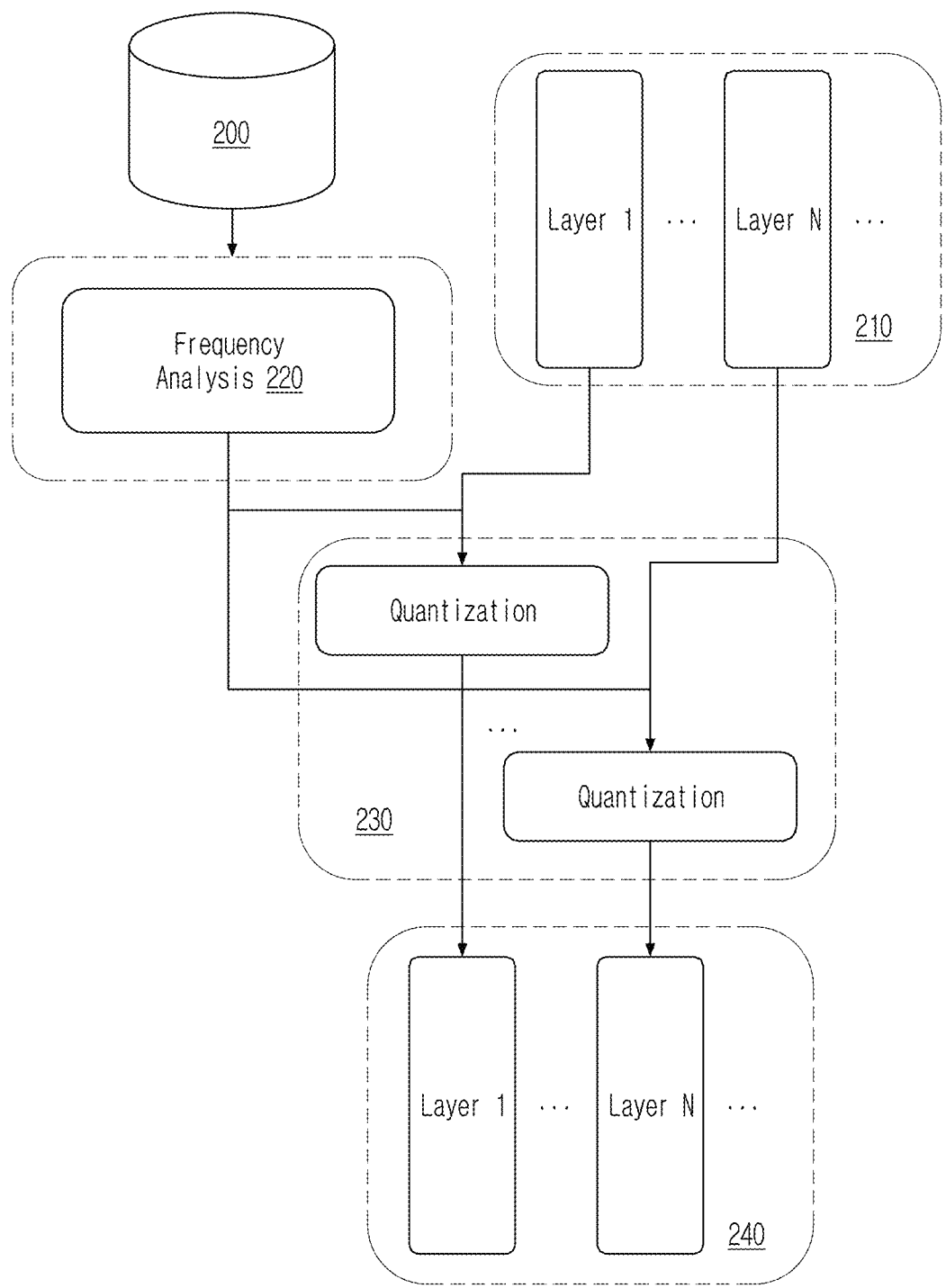
FIG. 2a is a schematic diagram showing some of the key modules for adapting the original model to a personalised model.

FIG. 2a shows more detail of the personalisation method of FIG. 1. The general-purpose model 210 and personalised model 240 are both neural networks and both comprise a plurality of layers (1, . . . , N). The models may be any type of neural network, including for example convolution neural networks (CNNs) or transformers. The layers may thus be any type of layer, including for example convolutional, linear or transformer layers. As schematically illustrated in FIG. 2a, each layer in the general-purpose model is quantized in the quantization module 230 and the resulting quantized layer is used in the personalised model 240. Thus, there is layer-wise personalised quantization. The number of layers in the personalised model is the same as the general-purpose model. The user data 200 is used by the quantization module 230 and this user data 200 is typically unlabelled, new data which was not used in the training of the general-purpose model.

There are two intuitions which indicate that personalisation which takes frequency into account is likely to be helpful, particularly when processing the speech/audio models. Firstly, neural networks typically encode frequency information in different layers. This is described for example in "On the Spectral Bias of Neural Networks" by Rahaman et al published in ICML 2019. This is addressed in the current method by quantizing different layers based on sensitivity as described below. Depending on the nature of the model, sensitivity may depend on the frequency distribution of the expected input data or may change as data frequency changes. Secondly, different words and phonemes typically occupy different frequency ranges. Similarly, some phonemes are more prevalent in different languages and frequency ranges vary between different speakers. Accordingly, as explained below, the method compresses the general model in different ways for a wide variety of users without requiring labelled data or access to personal information.

When compressing speech/audio models, frequency analysis 220 may be carried out on the user data 200 so the method may be termed frequency driven personalized quantization. For example, in 2017, Erik Bernhardsson published an article entitled "Language Pitch" and the first plot shows the magnitude of the Fast Fourier transform (FFT) coefficient against frequency on a gender partitioned dataset (e.g. female and male speakers). Male and female speakers have different frequency characteristics. Female voices have lower FFT coefficient values in lower frequency regions and higher FFT coefficient values in higher frequency regions than males. The article also compares the frequency ranges of different languages to show that different languages also have different frequency ranges.

Figure 2B:
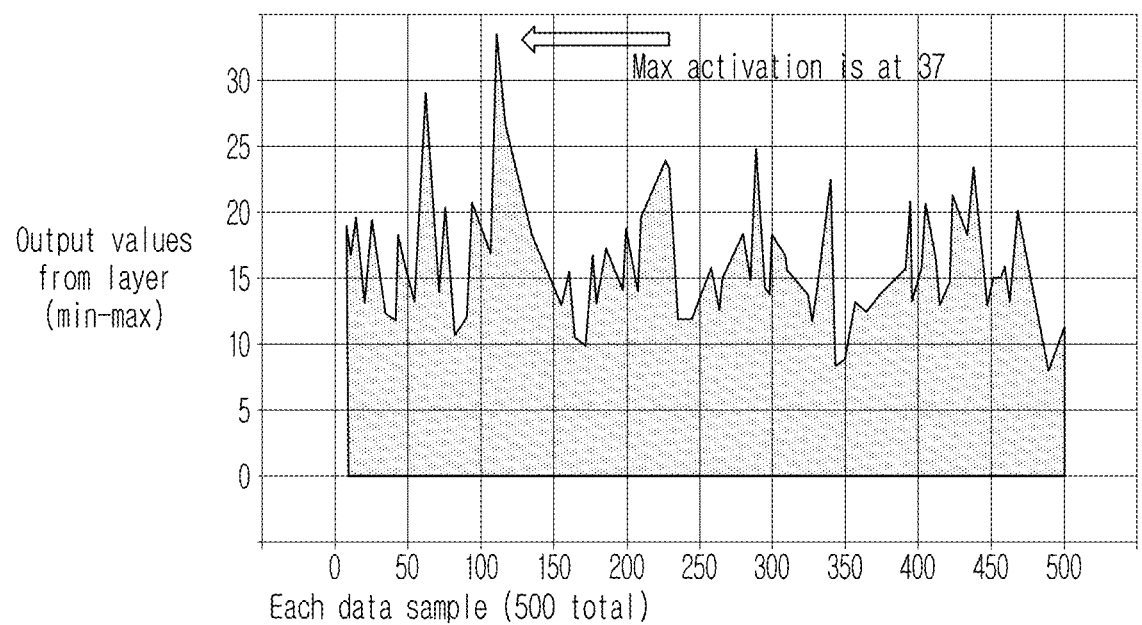
FIG. 2b plots activation values against data samples for a first layer in a model, wherein the data samples are from female and male speakers respectively.
Figure 2C:
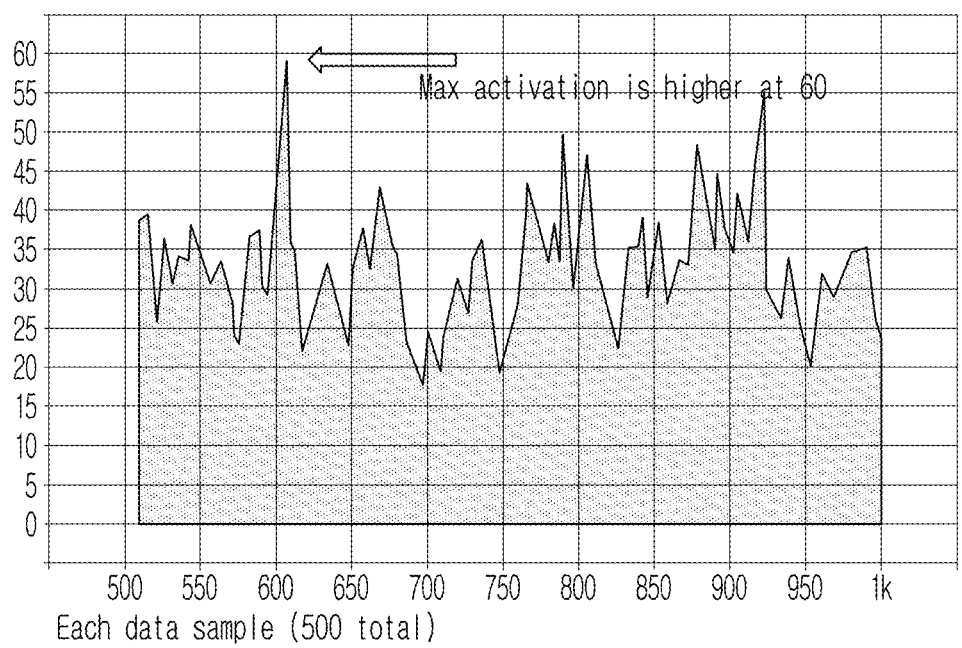
FIG. 2c plots activation values against data samples for a first layer in a model, wherein the data samples are from female and male speakers respectively.

Further frequency analysis may be done using the full precision model. For example, FIGS. 2b and 2c plot the output values from the first layer in a Wav2Vec2 model which has been pre-trained on female and male data. FIG. 2b plots the data for 500 female samples and FIG. 2c plots the data for 500 male samples. FIG. 2c has a high maximum activation layer at 60 compared to 37 for FIG. 2b. This suggests that layer 1 is more sensitive to quantization for low frequency inputs, e.g. male speakers. Similar plots (not shown) for layer 4 indicate that layer 4 has a maximum activation of 180 for female speakers but just 10 for male speakers. This suggests that this layer is more sensitive to quantization for high frequency inputs, e.g. female speakers.

Figure 2D:
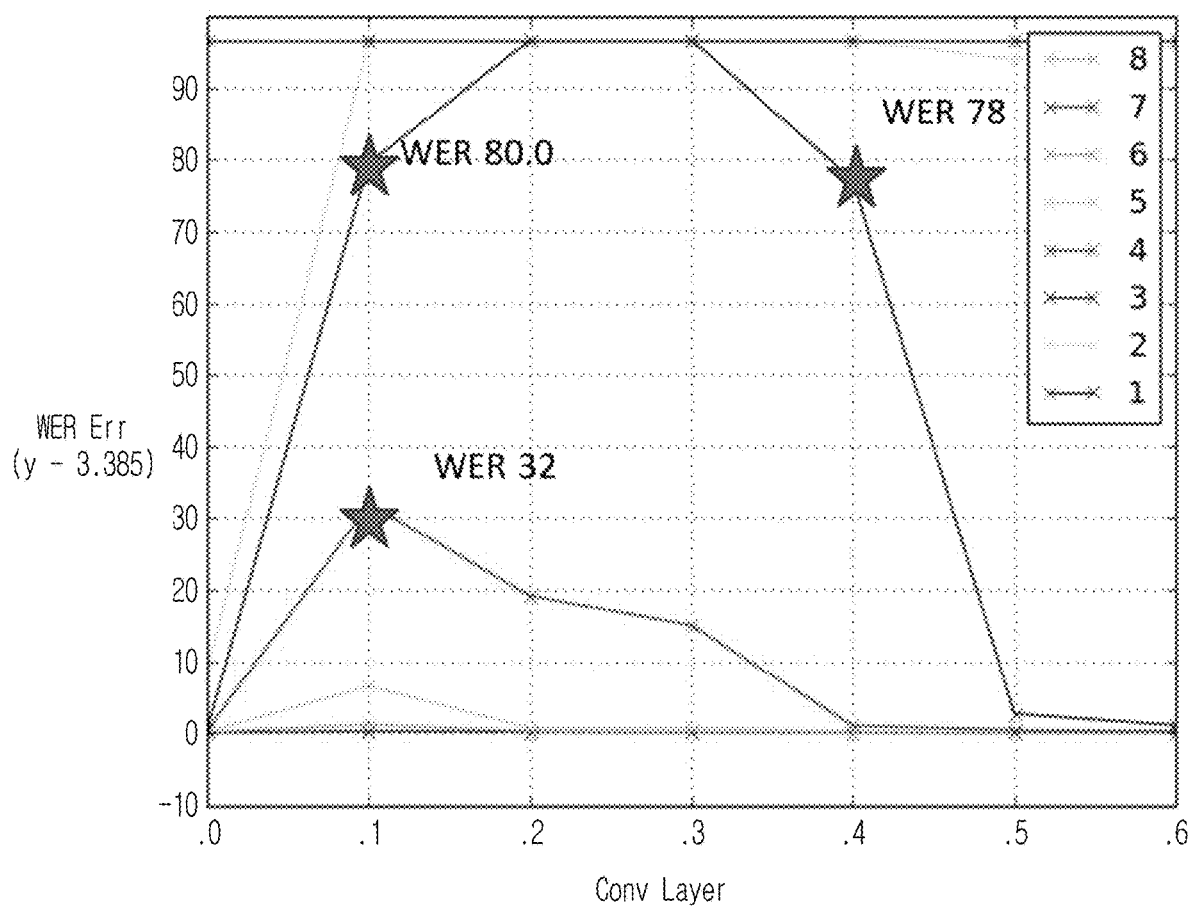
FIG. 2d plots word error rate against convolution layers, wherein the data samples are from female and male speakers respectively.
Figure 2E:
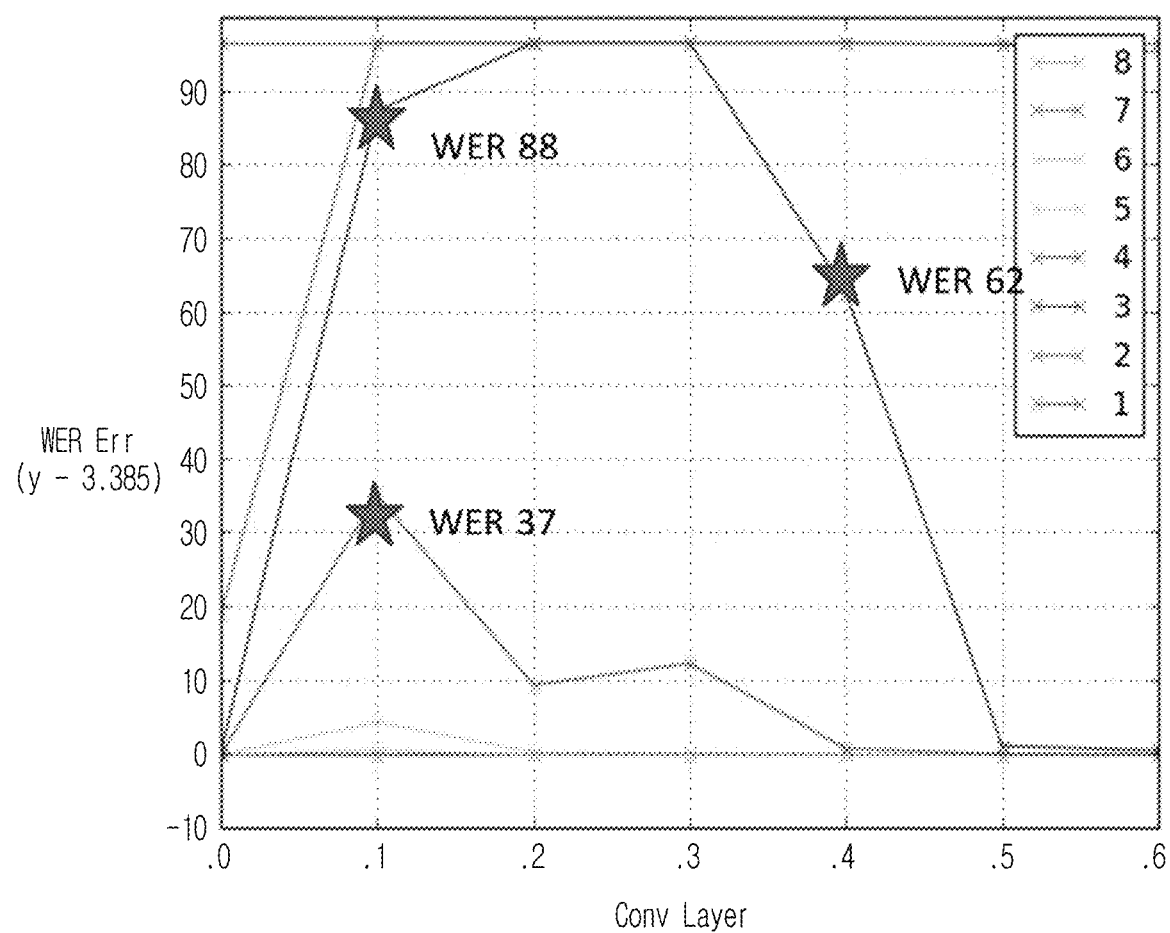
FIG. 2e plots word error rate against convolution layers, wherein the data samples are from female and male speakers respectively.

As another example of frequency analysis, the word error rate (WER) may be evaluated for the Wav2Vec2 model when compressed to different bit depths using either male or female data from LibriSpeech. FIGS. 2d and 2e plot the WER against convolution layer for the female and male data respectively. The different lines represent the different number of bits for each layer and vary between 1 and 8. When layer 1 has a depth of 3 bits, there is a WER of 88 for the male data and a WER of 80 for the female data. Similarly, when layer 1 has a depth of 4 bits, there is a WER of 37 for the male data and a WER of 32 for the female data. This shows that layer 1 is more sensitive on the male partition than the female partition when compressed. When layer 4 has a depth of 3 bits, there is a WER of 62 for the male data and a WER of 78 for the female data. This shows that layer 4 is more sensitive on the female partition than the male partition when compressed.

As another example of the variation which results for different users, FIG. 2f is a graph which plots the occurrence of an activation value for both a female voice 450 and a male voice 452 which has been determined using Wav2Vec2-Base on female and male data. FIG. 2f shows that the range of activation values is smaller for the male data than for the female data.

FIGS. 2b to 2f illustrate that frequency analysis may be used for audio/speech models. In a similar manner, the different layers of the models will also show different activations when processing text, images or videos. Thus, the frequency analysis may be generalized to determining statistics from the embedded feature representations as explained in more detail below. The main difference is the dimensionality of data. In speech, we have a temporal dimension but not in text or images. In images, we have spatial dimensions. In video, we have both temporal and spatial dimensions. Nevertheless, statistics can be extracted in a similar way in all cases.

Figure 3:
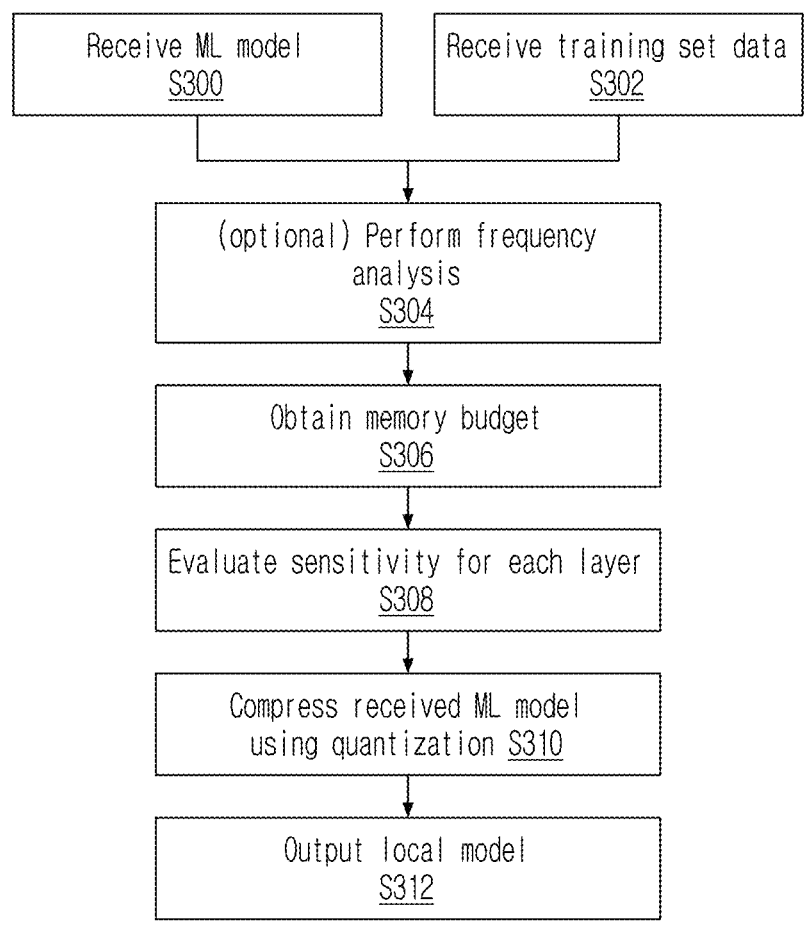
FIG. 3 is a flowchart of a method of personalising a model using quantization.

FIG. 3 provides the steps of the method of personalized quantization which was schematically illustrated in FIGS. 1 and 2. In a first step S300, a general ML model is received. As explained above, the general model has been trained centrally at high precision. In a second step S302, which may be simultaneous with the first step, a set of local user data is received. This local data may be unlabelled. For simplicity, the target user index k Is dropped. The general ML model (also termed network) which has been pre-trained on a dataset composed of multiple data subsets may be parametrized by a set of model parameters or weights $\mathcal{W}=\{W_l\}_{l=1}^{L}$ with l∈[L] layers in the network. The set of local data $\mathcal{U}$ may be have only a few unlabeled samples available, with $|\mathcal{U}|\leq 32$ in our experiments.

As explained in more detail below, frequency or similar analysis may be optionally performed at step S304. The next step S306 is to obtain the memory budget B for the local model. The general ML model is to be quantized to meet this storage budget B minimizing the error rate for the received target subset. The method may comprise two stages. At step S308, there is a first stage which is layer-wise sensitivity detection—where we perform inference on $\mathcal{U}$ and collect statistics of the raw model. At step S310, there is a second stage which is calibration, where we adjust network parameters based on $\mathcal{U}$. This compresses the general ML model using quantization. At a final step S312, the local model is output.

Sensitivity Detection

Figure 4B:
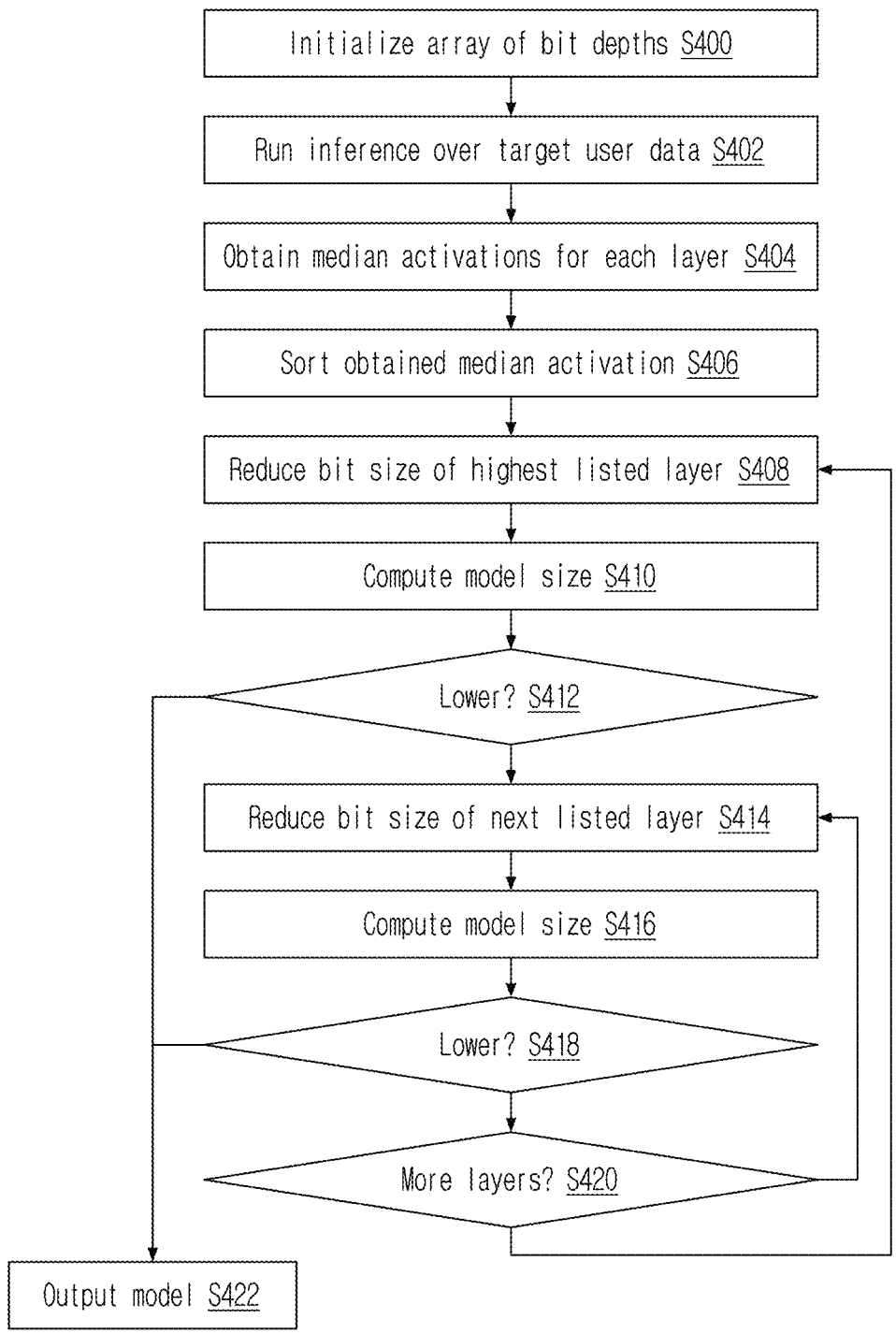
Figure 5A:
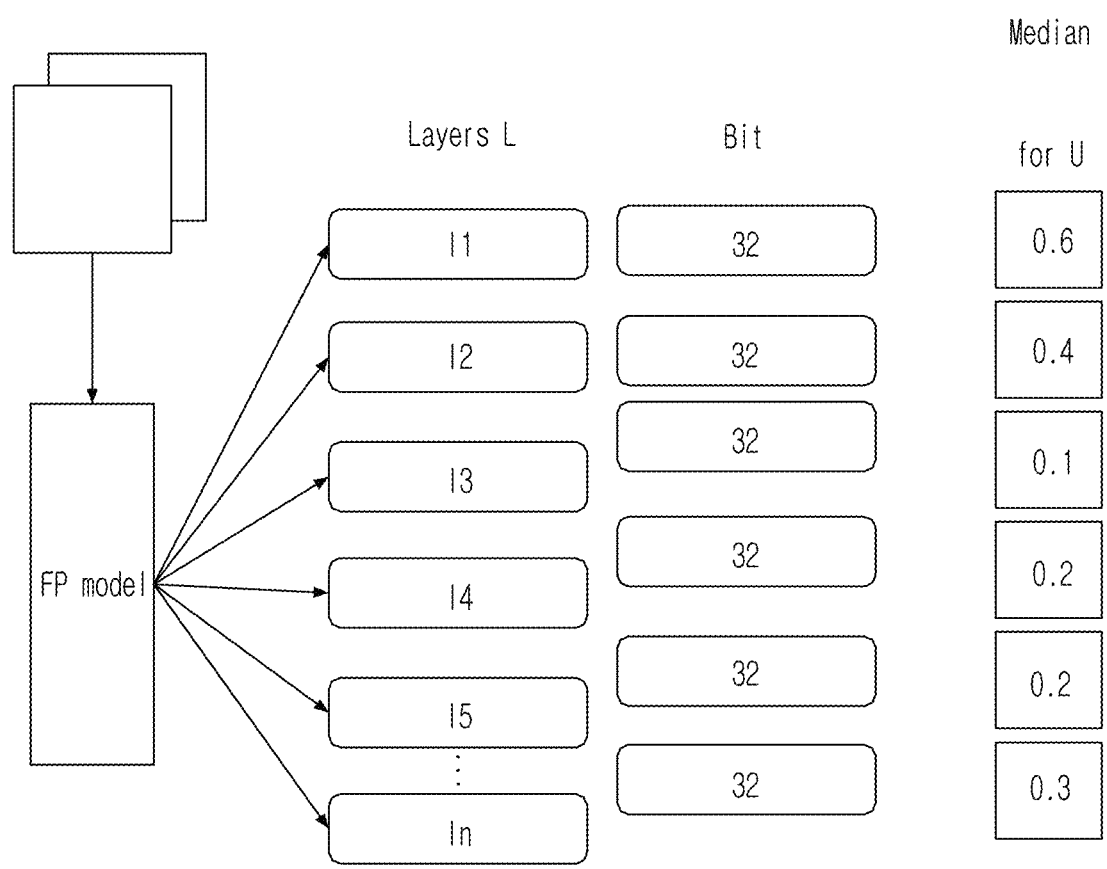

FIG. 4a is an algorithm which may be used in the first stage of layer-wise sensitivity detection and FIG. 4b is a flowchart representing the algorithm of FIG. 4a. The algorithm may be implemented on the user device or on a server. The input data for the algorithm is the memory budget B for the local model, the size M of the general ML model (where M>B) and the model parameters of the general ML model $\mathcal{W}$. The general ML model has L and the model parameters for each layer may be represented by an array b of bit depths. An example general ML model is schematically shown in FIG. 5a and six of the plurality of layers (11, 12, 13, 14, 15, . . . , ln) are shown. Each layer has a bit depth of 32 bits initially. Such a general ML model may be termed a full precision (FP) model and the terms are used interchangeably. Merely as an example, the FP model in FIG. 5a has an overall size of 350 Mb and the target budget is 75 Mb.

Returning to FIGS. 4a and 4b, the first step S400 of the method is to initialise the array b of bit depths. The next step is to compute the activation output of each layer (e.g. each convolution and/or linear layer) and this may be done using any suitable method, for example by inserting observers. The activation may be measured using any standard technique, e.g., after ReLU as introduced in Fukushima, K. "Cognitron: A self-organizing multilayered neural network" published in Biological Cybernetics, 20(3), 121-136 or Leaky-ReLU, as introduced in Maas, Andrew L. et al. "Rectifier nonlinearities improve neural network acoustic models" published in the International Conference on Machine Learning (ICML). Vol. 30. No. 1. 2013, or GeLU as introduced in Hendrycks D. et al., published on arXiv: 1606.08415.

As shown in FIG. 4b, we run inference over the unlabeled target dataset $\mathcal{U}$ at step S402 and obtain at step S404 the median values of output activations, $a\in\mathbb{R}_+^L$, such that $a_l \triangleq a[l]$ is the median of outputs obtained at the l-th layer $o_l$. The obtained median values may be stored locally on the user device. We take the absolute of median values from each layer (to measure how much they differ from 0 regardless of their sign). Merely as an example, values for the median activation value for each layer are shown in FIG. 5a and range between 0.6 and 0.1.

Returning to FIGS. 4a and 4b, the next step S406 is to sort the median activation layers from highest to lower. While the size M is larger than the memory budget B, the method then iterates through the following steps to select mixed precision bit-depths $b\in\mathbb{Z}_+^L$. Reduce size of lowest listed layer by 1 at step S408. Compute model size at step S410. The next step S412 is to determine whether the computed model size is lower than the target memory budget. If the model size meets the target, the local model can be output at step S422. Otherwise, the size of the next lowest listed layer is reduced by 1 at step S414. The model size is computed at step S416 and when it is determined at step S418 that the model size is lower than the target memory budget, the local model can be output at step S422.

Figure 5B:
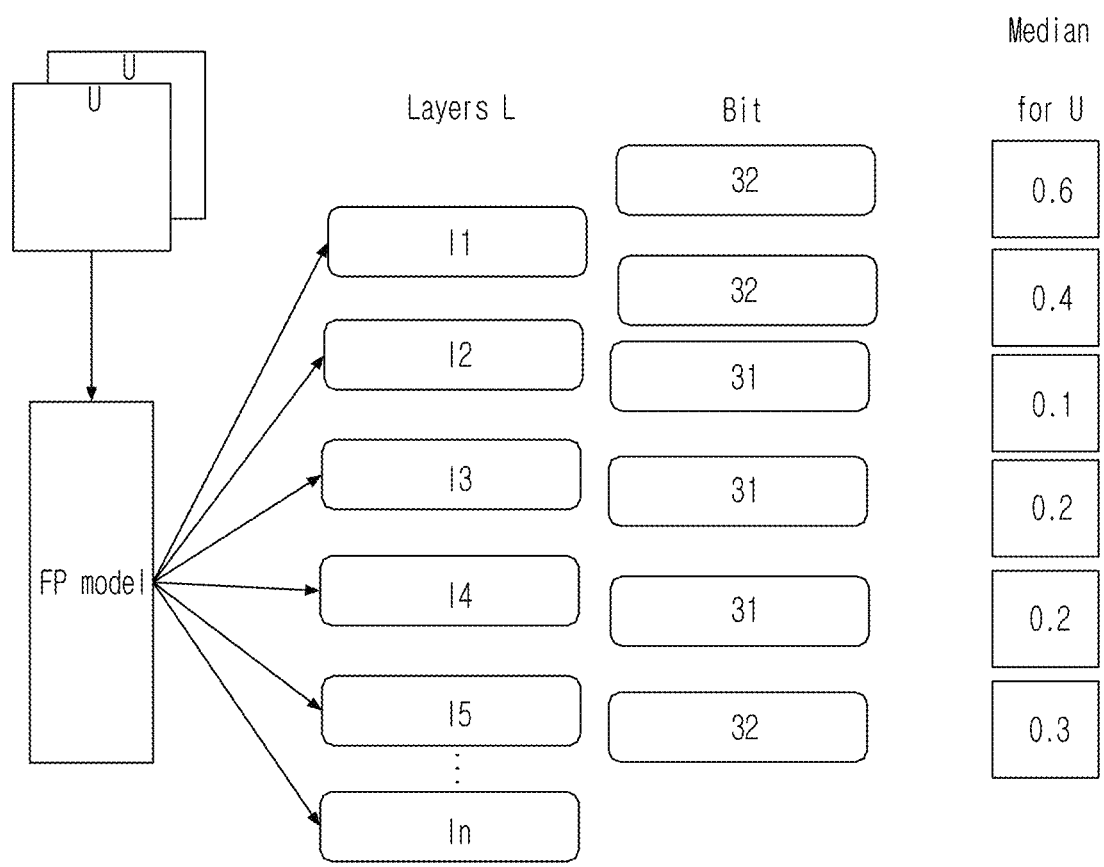

When it is determined at step S418 that the model size is higher than the target memory budget, the next step is to determine whether there are any more layers at step S420. When there are more layers, the method loops back to step S414 to reduce the bit size of the next layer. For example, FIG. 5b shows the process after the first three layers with the lowest median activation have been reduced by 1 bit from 32 to 31. As an example, the size of the model after these three changes is 250 Mb. This is reduced from an original size of 340 Mb but is still significantly higher than the target of 75 Mb. FIG. 5b shows that the activation values which are calculated remain the same throughout the process.

Figure 5C:
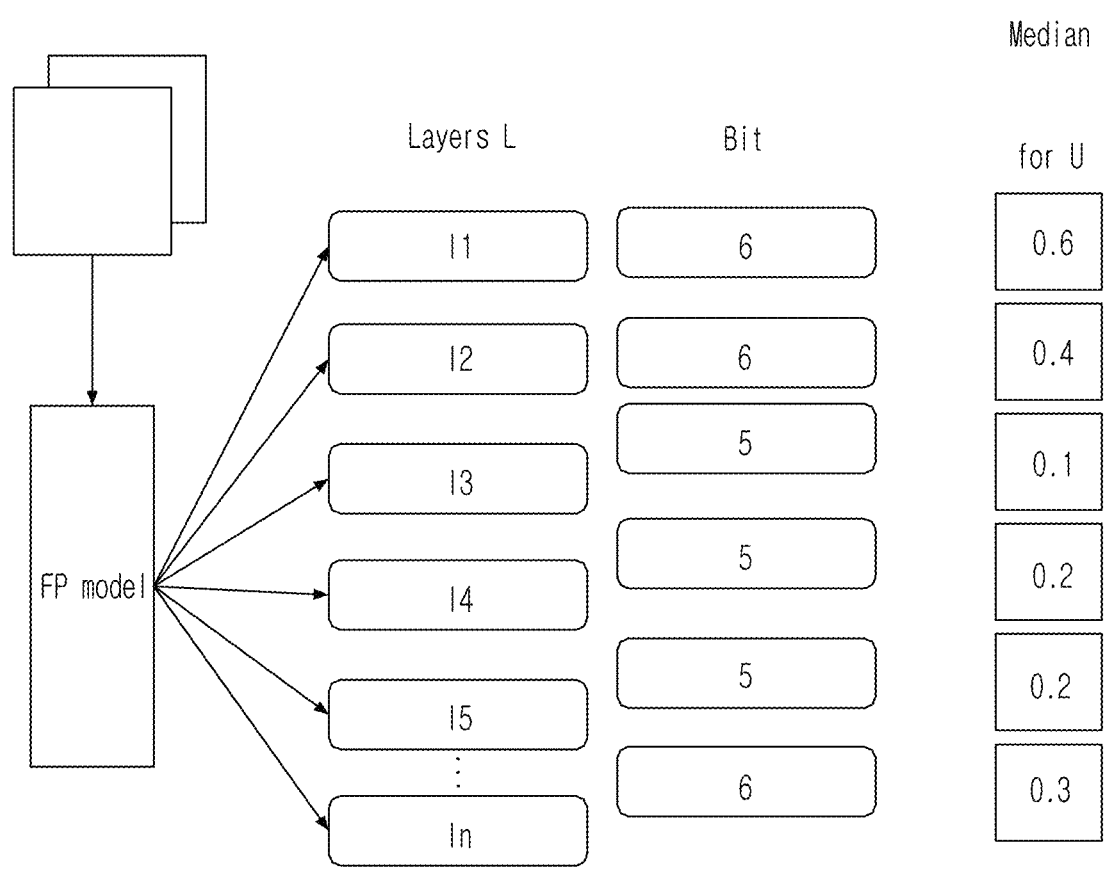

Returning to FIGS. 4a and 4b, for each layer, steps S416, S418 and S420 are repeated. When it is determined at step S420 that there are no more layers, i.e. each layer in the model has been reduced by 1, the method loops back to step S408 to reduce the bit size of the lowest listed layer. The method then iterates through steps S410 to S420 until the local model size meets the target budget. Merely, as an example, FIG. 5c illustrates the final output in which the target budget is met when the bit size for each of the three lowest median valued layers in the model (13, 14 and 15) are reduced to 5 and the bit size for all other layers is 6.

We empirically observed a positive correlation between the median of activations and quantization error of the layer with respect to the input samples. As shown in "Low-bit quantization needs good distribution" by Yu et al published in the Computer Vision and Pattern Recognition Worksops (CVPRW) in 2020, at low bit-depths, uniform distribution of weights can reduce quantization error, thus the median measures distribution skew at full precision which relates to quantization sensitivity. By contrast as shown in the method above, we select the bit depths b according to the memory budget B, where $|W_l|$ counts parameters of each layer of.

The method of FIGS. 4a and 4b performs inference only once with a small number of samples to select the mixed precision scheme, making our method more memory and computationally efficient than other distance-based or loss-based metrics. Once inference is performed, we search for the quantization scheme by reducing each layer by one bit until the budget is reached while retaining the highest degree of uniformity among bit depths between layers. This uniformity constraint during the sensitivity detection avoids the need for any additional hyper-parameters such as min(b) and max(b) denoting the minimum and maximum valued bits in b. Such parameters are typically required by other methods which set a priori range of bit widths for compression. The method described in FIGS. 4a and 4b is a quantization function which determines the optimal number of bits to use for each layer of a pre-trained network based on a new unlabelled data source. The input is unseen, unlabelled user data (e.g. audio data for ASR) and the output is a layer-wise list of bit depths.

Quantization & Calibration

Once we have obtained the optimum bit depth, we proceed with quantization (e.g. step S310 in FIG. 3). For each layer, we quantize both weights, $W_l$, and inputs, $X_l$, using a quantization function $Q(\theta_l, b_l)$ where $\theta_l \in \{W_l, X_l\}$. The objective is to restrict the full precision values of $\theta_l$ to finite integer values by scaling and rounding, as defined by $$Q(\theta_l, b_l) = [\text{round}(\theta_l/S_l) - Z_l]_{b_l}, \qquad (1)$$

where round(•) is the integer rounding operation, $Z_l$ corrects the zero point of the quantized output, $[\bullet]_{b_l}$ is the representation of • with $b_l$ bits, $\theta_l \in \{W_l, X_l\}$ is the set of weights and inputs for the full precision model and $S_l$ is the scaling factor.

Standard uniform quantization is described for example in "A survey of quantization methods for efficient neural network inference" by Gholami et al publisehd in arXiv: 2103.13630, in 2021. The scaling factor $S_l$ is defined by the maximum available values given by the bit for layer l, $b_l$, i.e, $S_l=2^{b_l-1}$. A uniform quantization function $Q(\theta_l, b_l)$ is directly applicable for quantization of weights $W_l$, as they follow a Gaussian distribution. However, as shown for example in FIG. 2g, activations do not necessarilty follow a Gaussian distribution, so there may exist $S_l$ values which can minimize the quantization error more effectively. We employ three methods to find an appropriate scaling factor $S_l$ to scale activations, which we describe next.

The first method, called myQASR, inserts observers in the network to track the layer-wise minimum $(X_l^m)$ and maximum $(X_l^M)$ values of the input tensors at full precision. Merely as examples, the techniques are described in chapter 15 of "Deep learning with PyTorch" by Stevens et al published by Manning Publications in 2020 and on the Pytorch website at https://pytorch.org/docs/stable/quantization.html. These minimum and maximum values can be seen for example in FIG. 2e. The layer scale $S_l$ and zero point $Z_l$ for the input tensor are then obtained by $$S_l = (X_l^M - X_l^m)/(2^{b_l-1}) \qquad (2)$$

$$Z_l = -2^{b_l-1} - \text{round}(X_l^m/S_l) \qquad (3)$$

where $X_l^m$ is the minimum activation value for each layer of the full precision model, $X_l^M$ is the maximum activation value for each layer of the full precision model, $b_l$ is the number of bits in the layer, $S_l$ is the scaling factor for each layer and Z is the zero point for each layer.

We also experiment with other $S_l$, by minimizing the distance between quantized and full precision output of layers using a calibration data set and hence using a calibration step. In this setting, we define a range of possible values for $S_l$ defined by the minimum and maximum values given by $b_l$, and then take the distance between the full precision output and quantized output $(\hat{o}_l)$ where $$\hat{o}_l = Q(W_l, b_l)^T Q(o_{l-1}, b_l).$$

where Q is the quantization function, $o_l$ is the output vector for each layer L of the full precision model, $W_l$ is the set of weights for each layer l and $b_l$ is the number of bits in the layer. More information on methods for minimizing the distance is provided for example in "Easyquant: Post-training quantization via scale optimisation" by Wu et al published in NeurIPS, 2020. In the ablation study described in more detail below, we evaluate a number of distance metrics for this calibration stage and find that the cosine distance is the most effective.

The second method (called myQASR-Hess) is driven by the recent observations where quantization of GELU and softmax outputs benefits from asymetric non-uniform quantization schemes due to their non-Gaussian distribution. A non-uniform quantization scheme is taught for example in "Ptq4vit: Post-training quantization for vision transformers with twin uniform quantization" by Yuan et al published in Springer, 2022, pages 191 to 207. As described in this non-uniform quantization scheme, the second of our methods utilises two quantization ranges per layer, $R_1^l$ and $R_2^l$ for post-GELU activations:

$$R_1^l = \left[-2^{k-1} S_{R_1^l}, 0\right] \text{ and } R_2^l = \left[0, -2^{k-1} S_{R_2^l}\right]$$

where $S_{R_1^l}$ and $S_{R_2^l}$ are the scaling factors for each quantization range for each layer and k is the current user with k=1, 2, ..., K.

Merely as an example FIG. 3 of "Ptq4vit: Post-training quantization for vision transformers with twin uniform quantization" by Yuan et al illustrates two quantization ranges for a softmax layer (which is typically the last layer of the neural network before the output layer). The first range R1 has values below 0.25 and the second range R2 has values above 0.25. Two quantization ranges for a GELU (Gaussian Error Linear Units) layer are also illustrated in FIG. 3 of the paper. The first range R1 has values below 0.0 and the second range R2 has values above 0.0

Finding the optimum scaling factors $S_{R_1^l}$ and $S_{R_2^l}$ can be performed via a linear search where the objective is to minimize the distance over a calibration data set between the quantized and the full precision output of each layer scaled by its impact on the task loss $\mathcal{L}(y, y)$. The Hessian-based calibration optimization for layer l is defined by $$\min_{S_{R_1^l}, S_{R_2^l}} \mathbb{E}_{\mathcal{U}}\left[\Delta_l^t \mathrm{diag}\left[\left(\frac{\partial \mathcal{L}_{\mathcal{U}}}{\partial o_i}\right)^2\right]_{i=1}^L \Delta_l\right]. \quad (4)$$

where $\Delta_l = \hat{o}_l - o_l$ is the distance between the output of the full precision layer and the quantized layer, $\frac{\partial \mathcal{L}_{\mathcal{U}}}{\partial o_i}$ represents the loss of the full precision network over the calibration data set with respect to the output of the layer and $\mathbb{E}_{\mathcal{U}}$ is the expectation computed over the calibration data set. Thus, a Hessian based calibration stage is carried out.

The third method (myQASR-Cosine) determines the scaling factors using the cosine distance, i.e. by using $$\min_{S_{R_1^l}, S_{R_2^l}} \mathbb{E}_{\mathcal{U}}\left[\frac{\hat{o}_l \cdot o_l}{\|\hat{o}_l\| \cdot \|o_l\|}\right]. \quad (5)$$

where $S_{R_1^l}$ and $S_{R_2^l}$ are the scaling factors for each quantization range $R_1$ and $R_2$, $o_l$ is the output vector for each layer L of the full precision model, $\hat{o}_l$ is the output vector for each layer L of the quantized model and $\mathbb{E}_{\mathcal{U}}$ is the expectation computed over the calibration data set. In this example, there is a calibration phase using the cosine distance. As we will see in the results below, this third method of determining the local parameters for the quantized model provides the best results for personalized quantization at the cost of a remarked increase in calibration time and memory consumption which may not be available in certain deployment scenarios.

Figure 6:
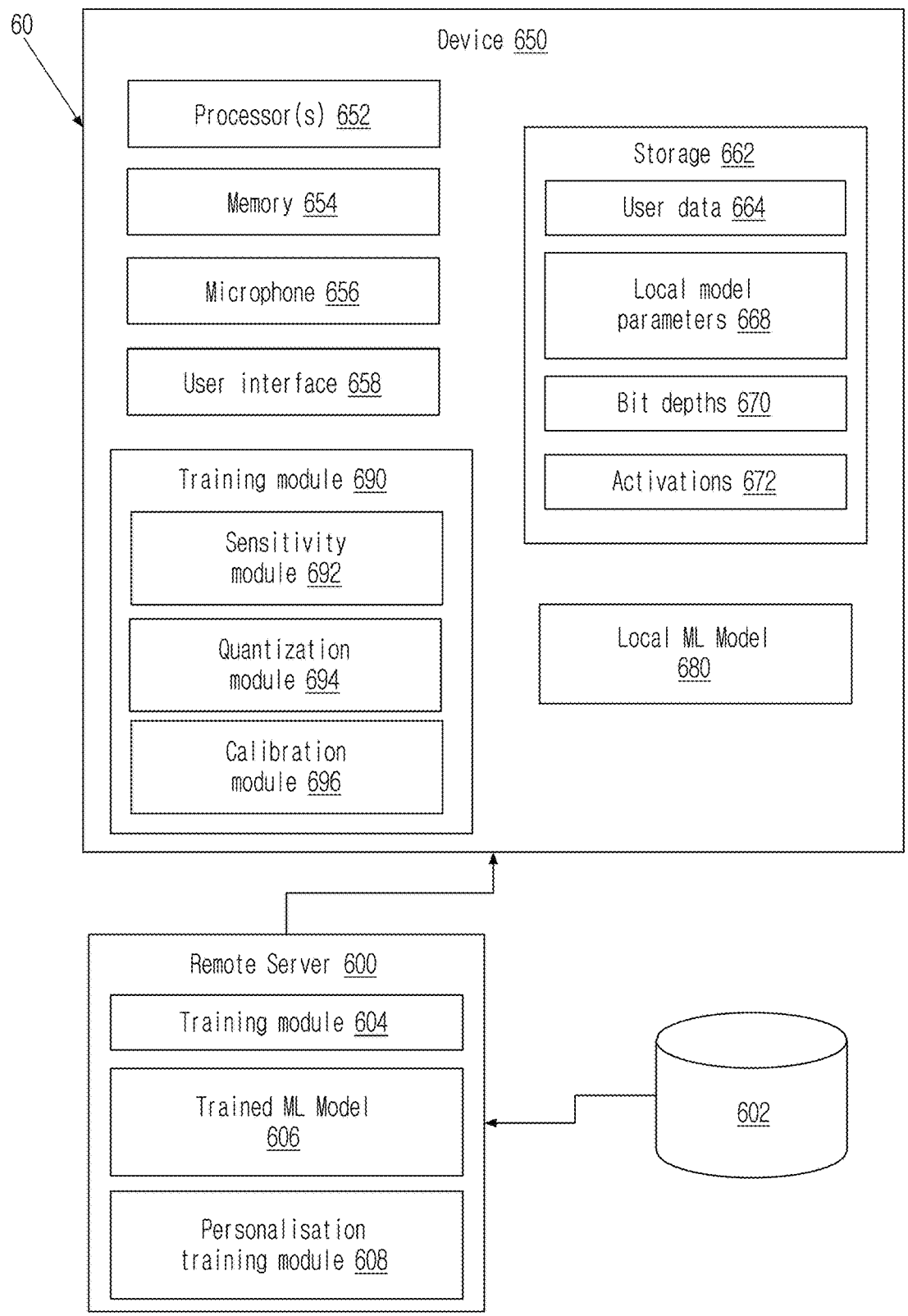
FIG. 6 is a schematic block diagram of a system for implementing the method of FIG. 3.

FIG. 6 is a block diagram of a system 60 comprising a server 600 for training a full precision machine learning, ML, model 606 and a user device 650 for implementing the methods described above to generate a local ML model 680 which is then stored on the local device for use at inference time.

The server 600 is arranged to perform any pre-training steps which are required to generate an initial trained ML model 606. The server 600 receives reference training data (inputs x and outputs/labels y) from a database 602. The server 600 comprises a training module 604 which receives as input the reference data from the database 602 and outputs the basic or full precision model parameters (i.e. the set of weights or parameters θ which have been learnt during the training process). The initial trained ML model 606 is a large model as described above.

The user device 650 may be any one of: a smartphone, tablet, laptop, computer or computing device, virtual assistant device, a vehicle, a drone, an autonomous vehicle, a robot or robotic device, a robotic assistant, image capture system or device, an augmented reality system or device, a virtual reality system or device, a gaming system, an Internet of Things device, or a smart consumer device (such as a smart fridge). It will be understood that this is a non-exhaustive and non-limiting list of example devices. The device 650 comprises the standard components, for example at least one processor 652 coupled to memory 654. There may also be a microphone 656 for capturing speech and a user interface 658 to capture other user input. It will be appreciated that there may be other standard components which are not shown for simplicity. The device 650 may comprise one or more modules for collecting user data 664 which is stored in storage 662. Merely as examples, the modules may include the microphone 656 and the user interface 658.

The at least one processor 652 may comprise one or more of: a microprocessor, a microcontroller, and an integrated circuit. The memory 654 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example.

There is an optional training module 690 on the user device which personalises the full precision ML model 606 to generate a local ML model 680 which has a size below a target size suitable for storage on the user device. The training module 690 comprises a sensitivity module 692 which may determine the bit depths 670 of each layer by measuring activations 672 as described above. The training module 690 comprises a quantization module 694 which determines the local model parameters 668 at the determined bit depth for each layer of the model. The training module 690 may optionally comprise a calibration module 696 to determine the local model parameters 668 using the calibration data set and the determined bit depths 670 as described above. The bit depths 670, the local model parameters 668 and the activations 672 may be stored in the storage 662.

As an alternative to the training module 690 on the user device, there is also shown a personalisation training module 608 on the server 600. When using the training module 608 on the server, local data is received from the user device 650 to carry out the personalisation. Like the training module 690 on the user device, the personalisation training module 608 on the server 600 comprises a sensitivity module, a quantization module and an optional calibration module. The bit depths, the local model parameters and the activations which are determined during the personalisation process described above may be stored in the database 602. The personalised ML model which is generated on the server is then sent to the user device to be stored as the local ML model 680.

Experimental Analyses

The method above is compared with various different known methods to demonstrate its effectiveness. In the experiments, we focus on automatic speech recognition (ASR) and keyword spotting (KWS) as examples to show the effectiveness. We use Word Error Rate (WER) and Character Error Rate (CER) for ASR tasks, and we use accuracy (ACC) for KWS.

Datasets. We employ three datasets, one for each personalization task. To demonstrate our method, we partition data into subsets. However, the new method described above (which may be termed myQASR) requires no a priori assumption on data split. We replicate a deployment scenario, where myQASR sees only a small amount of unlabelled target data from a user. The first personalisation is Gender-wise Personalization. LibriSpeech (LS) is described in "Librispeech: An asr corpus based on public domain audio books" by Panayotov et al published in ICASSP in 2015 and contains approximately 1000 hours of 16 kHz English speech derived from audiobooks. We perform experiments on test-clean, creating Male (M) and Female (F) partitions, splitting audio data by speaker gender.

The second personalisation is Language-wise Personalization. FLEURS which is described in "Fleurs: Few-shot learning evaluation of universal representations of speech" by Conneau et al. published in Spoken Language Technologies (SLT) in 2022 contains 102 languages, each with approximately 12 hours of speech. We select ten among the top performing languages (e.g. as described in the Whisper architecture in "Robust speech recognition via large-scale weak supervision" by Radford et al. published in arXiv: 2212.04356 in 2022). For each experiment, we randomly sample 32 full spoken sentences for calibration. The third personalisation is speaker-wise Personalization. Google Speech Commands (GSC) described in "Speech commands: A dataset for limited-vocabulary speech recognitions" by Warden and published in arXiv:1804.03209 in 2018 is designed to evaluate effectiveness of keyword spotting models. The dataset contains one second long audio files from multiple speakers. We use the test partition v0.01, which contains 3081 spoken words. For calibration, we select five words from each speaker and test performance on all the available test data per speaker.

Models. We use Wav2Vec2 (W2V2) which is described in "wav2vec 2.0: A framework for self-supervised learning of speech representations" by Baevski et al published in NeurIPS in 2020 and Whisper described above to evaluate our method. Whisper is a multi-lingual sequence to sequence (encoder/decoder) transformer model pre-trained on 680K hours of multi-lingual supervised audio data. We experiment on the Whisper-L, i.e, the large variant. For all models, we quantize all weights and activations. On LibraSpeech (LS), we use a pre-trained W2V2 base (B) model fine-tuned on 960 hours of clean English audio data from LS. For keyword spotting (KWS), we use a W2V2-Large-Conformer (W2V2-L-C), as described in "fairseq s2t: Fast speech to text modelling with fairseq" by Wang et al published in AACL 2020 Demo. The conformer is pre-trained on Google speech commands. Average bit depth is denoted by $\bar{b}$.

Figure 7:
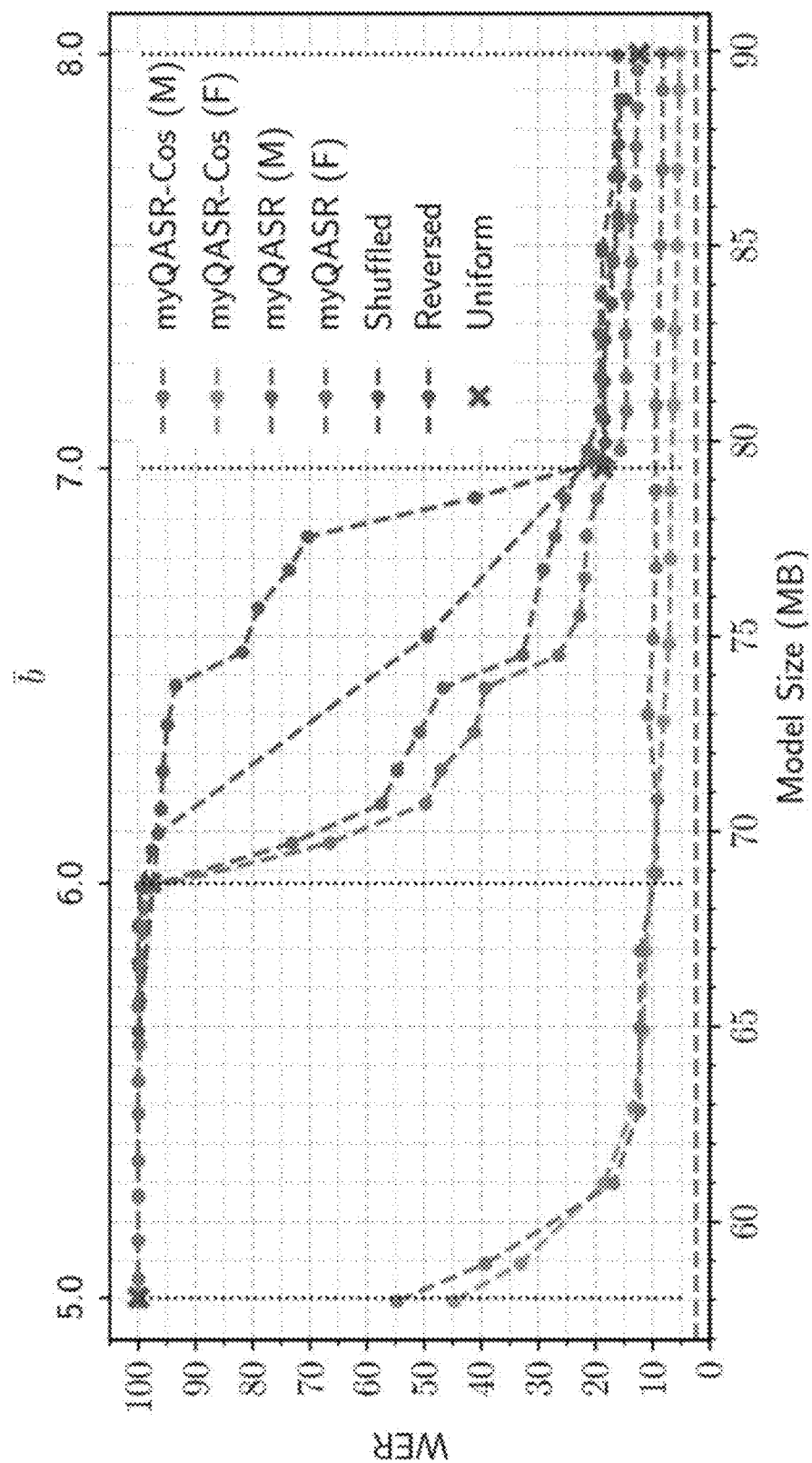
FIG. 7 plots the word error rate (WER) against model size in MB for various embodiments of the proposed solution, compressing a Wav2Vec2-Base model to either male or female speakers.

Main Results on Gender. FIG. 7 plots the word error rate (WER) against model size in Mb for various models. The average value for each bit is also shown. The full precision model is W2V2-B pre-trained on multi-gender data, quantized for a female user and tested on the female data from LibraSpeech (LS-F). As expected the original (i.e, full precision, non-quantized) model performance indicates the lower bound for WER (lower dashed line). Uniform quantization is plotted with crosses. When the model size is around 80 or 90 Mb, uniform quantization yields competitive results, however it cannot meet fine-grained memory requirements.

The different models generated using the methods described above span an increasing memory budget from 60 MB (i.e, $\bar{b} \approx 5$) to 90 MB (i.e, $\bar{b} \approx 8$). The simplest implementation of the method above is named myQASR(F). This is a model which after the bit depths have been determined using the sensitivity method described above is then calibrated (i.e. quantized) on female data. For comparison, the results for the same sensitivity of model which has been calibrated (i.e. quantized) on male data are plotted as myQASR (M). The usefulness of the sensitivity method alone is clear because myQASR (F) shows significant benefits compared to myQASR (M).

Two other methods are also plotted for comparison. These are shuffled in which the bit-depths generated by the sensitivity method are randomly shuffled and reversed in which the bit-depths generated by the sensitivity method are reversed. myQASR (F) also outperforms the shuffled or reversed versions by a large margin.

The simplest implementation is improved by using cosine-based calibration. The model which is calibrated on female data is labelled myQASR (F,Cos) and for comparison there is also a model which is calibrated on male data is labelled myQASR (M,Cos). Both these models brings large benefits over the other methods and reduce the gap from the full precision model. Nonetheless, calibration on female data still outperforms calibration on male data.

Main Results on Language. In the table shown in FIG. 8, we show personalized compression in multi-lingual settings (Catalan, German, English, French, Japanese, Korean, Dutch, Polish, Portuguese and Russian). In this experiment, we take the pre-trained multi-lingual Whisper-L model and calibrate bit-depths and activation ranges using just 32 samples of unlabelled data. Each language label represents a tune and test split, and we show that calibrating bit depths and activations for the same language leads to improved results. The table shows the word error rate (WER) for each combination of calibration and then test language. The final column also shows the WER when uniform quantization is used without any calibration.

FIG. 8 shows that we obtain better results on the same language used for calibration (on-diagonal results), except for Russian. We also remark that the resulting model still achieves competitive results on other languages (off-diagonal results). Thus the method is still able to predict also on such languages. In the worst case (Russian), our method is outperformed by calibration on other languages. However, it shows a relative gain of 0.9% compared to the average of other-language results. In the best case (Catalan), our method outperforms the average of other-language by 10.9% relative gain. On average, our same-language myQASR yields 66.2% better results than standard uniform quantization with no calibration (12.5% vs. 36.9% WER), and 4.2% better results than other-language quantization (13.0% WER).

Figure 9:
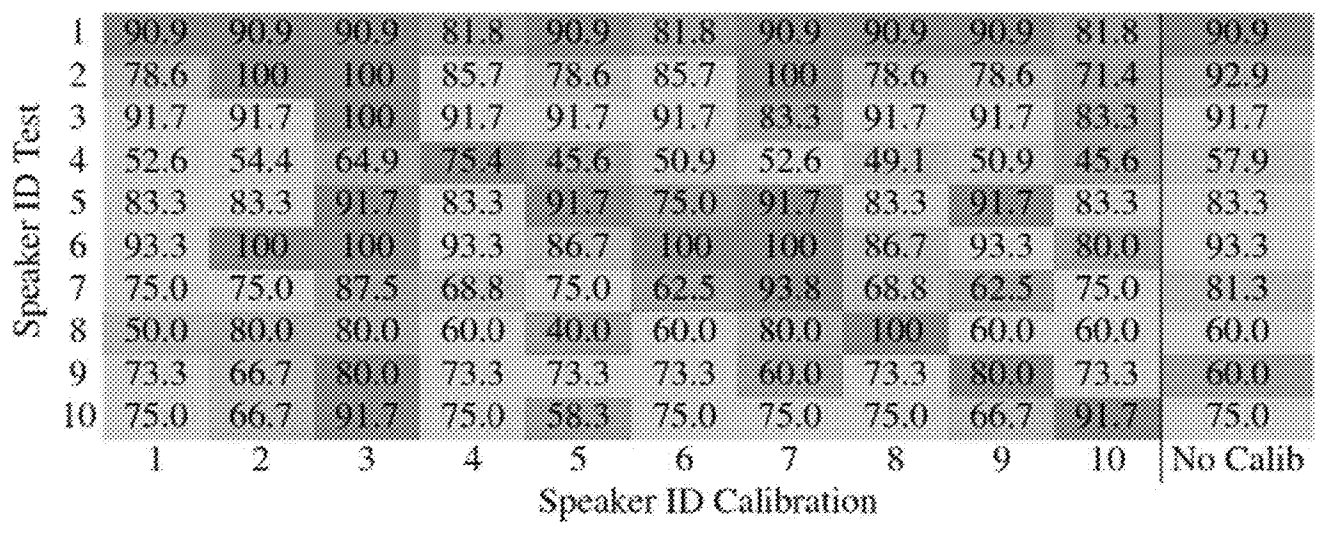

Main Results on Speaker. In the table shown in FIG. 9, we show accuracy (ACC) for our myQASR applied to a W2V2-Large-Conformer (W2V2-L-C), as described above. The method compresses the full precision model from 2.4 GB to 375 MB (i.e, $\bar{b}$=5bits). We partition Google speech commands by speaker ID and evaluate on each ID with calibration data from different speakers. The final column also shows the WER when uniform quantization is used without any calibration.

We show that, when sensitivity and calibration analysis is performed on the same speaker, we achieve optimum performance. For example, in the best case (speaker #7), we achieve 100% accuracy when compression is personalized for that speaker, compared with 40% accuracy when personalized for another speaker from the same dataset, even though keywords are the same. On average, our same-speaker myQASR yields 17.5% higher results than standard uniform quantization with no calibration (92.3% vs. 78.6% ACC), and 19.6% higher results than other-speaker quantization (77.2% ACC).

Ablation Study

Ablation is performed on W2V2-Base-Conformer (W2V2-B) compressed using the cosine variation of the method (myQASR-Cosine) to 75 MB, i.e $\bar{b}$=6.5, (unless otherwise stated) on gender data calibrated and tested on the same split.

Bit Depth Selection & Uniformity Constraint. In Table 1 below, we show a comparison in the word error rate between our method (WER(my)) and a known method of setting minimum and maximum bit depth (WER(mm)). This known method is described for example in "Hawq: Hessian aware quantization of neural networks with mixed-precision" by Dong et al. published in ICCV in 2019.

TABLE 1

|  | Male | Female |
|---|---|---|
| Size of model | 82.5 (5-7) | 82.3 (5-7) |
| WER(mm) | 6.6 | 7.4 |
| WER(my) | 4.7 | 5.3 |
| Size of model | 87.7 (6-7) | 97.7 (6-7) |
| WER(mm) | 5.6 | 5.5 |
| WER(my) | 4.3 | 4.9 |
| Size of model | 81.9 (4-8) | 82.1 (4-8) |
| WER(mm) | 6.9 | 6.6 |
| WER(my) | 7.1 | 6.2 |
| Size of model | 87.5 (5-8) | 87.5 (5-8) |
| WER(mm) | 6.4 | 7.0 |
| WER(my) | 4.3 | 4.9 |
| Size of model | 93.2 (6-8) | 93.0 (6-8) |
| WER(mm) | 5.4 | 5.3 |
| WER(my) | 4.1 | 4.7 |
| Size of model | 98.4 (7-8) | 98.2 (7-8) |
| WER(mm) | 4.2 | 4.6 |
| WER(my) | 4.2 | 4.6 |

For the known method we set min-max values for bit depths (e.g. 5-7), chosen according to a linear interpolation mapping the highest activation value to the min bit depth and the lowest activation value to the max bit depth, respectively. This known approach leads to significantly lower results at fixed target compression ratios (e.g. 82.5) than ours. In our method, we have a uniform constraint which achieves the overall target memory budget in a way that there is only a difference in one bit between each layer (in other words, the bit depth of each layer is subject to a uniformity constraint). In the final result in the table, the two methods lead to the same result. This shows the advantage of enforcing some uniformity among layers in the network. Using min-max bit depths also requires two more hyper-parameters that we avoid thanks to the sensitivity evaluation scheme, which is evaluated next.

Sensitivity is evaluated in the table shown in FIG. 10 in which only the measures used in other known methods are used for a fair comparison with the use of mean proposed in the algorithm of FIG. 4a. The results are grouped as reduction-based or distance-based methods. Reduction-based methods compute an aggregate measure of the distribution of activations obtained using the original model. These include for example average, median, max, max of the absolute and standard deviation. Distance-based methods compute a distance measure between layer-wise activations obtained using the quantized and original model. The distance measures include L1, L2 and KL divergence as described for example in "Ptq4vit: Post-training quantization for vision transformers with twin uniform quantization" by Yuan et al. described in ECCV in 2022, Spectral norm as described for example in "Post-training quantization for vision transformer" by Liu et al. published in NeurIPS in 2021 and Frobenius norm as described for example in "Understanding how orthogonality of parameters improves quantization of neural networks" by Eryilmax et al. in IEEE TNNLS in 2022.

Each of the measures (average, max, max of the absolute, standard deviation) is used in the same way as median in the algorithm in FIG. 4a to sort the values in order of increasing value and then to assign bit depths per layer. Similarly for the distance measures (L1, L2, Spectral norm, Frobenious norm and KL divergence) are used in the same way as median in the algorithm in FIG. 4a. Thus, the values are sorted in order of increasing distance and then used to assign bit depths per layer. Among reduction-based approaches, median provides the best results both for word error rate (WER) and character error rate (CER) for both males and females. The median also outperforms all the distance measures except for the CER for females for which L1, L2, Spectral Norm and Frobenius norm provide equally good results. Reduction-based methods are more practical than distance-based ones as they do not require both the quantized and original model, and can achieve performance comparable to distance-based methods. Hence median is the measure used in the algorithm in FIG. 4a. We reason that the median provides a measure of distribution skew at FP which correlates with quantization sensitivity as described in Yu et al published in the Computer Vision and Pattern Recognition Worksops (CVPRW) in 2020.

Calibration is evaluated in the table shown in FIG. 11. The table shows the word error rate (WER), character error rate (CER) and time (sec) measuring the calibration process only for both males and females. To evaluate it, we use a number of distance functions (L1, L2, LinW L2 and SqW L2) which compute the quantization error between full precision and quantized activations. These distance functions are described in "Ptq4vit: Post-training quantization for vision transformers with twin uniform quantization" by Yuan et al. published in ECCV in 2022. For each of these distance functions, we generate v possible quantization scales per each layer and minimize the error defined by the distance metric (v=100, as in the paper on Ptq4vit). These distance functions are compared with the three variations of our method (myQASR, myQASR-Hess and myQASR-Cosine) which are described above.

The variations of our method which use cosine and Hessian weighted methods perform the best but have a high computational search time. Using an L1 distance function achieves competitive results, however its WER is outperformed by myQASR-Hess with a similar calibration time. The simplest implementation of our method which performs a simple min/max calibration provides a trade-off between accuracy and computational time, and does not require linear search or any additional hyper-parameters that are required in the other methods.

We study the amount of unlabelled target data needed in the table shown in FIG. 12 which shows the word error rate (WER) for male and female data for different numbers of sample data (4, 8, 16, 31, 64 and 128). The table verifies that a few samples are sufficient for calibration. For robustness, we choose 32 samples, since variability of results is minimized (i.e, low standard deviation). Similarly, we perform personalized compression via 5 samples for speakers and 32 for languages.

Activation quantization bit depth is evaluated in the table shown in FIG. 13 (also weights are quantized). This shown the word error rate (WER) and character error rate (CER) for different numbers of active bits (e.g. 4, 6, 8, 10, 12, 16 and 32). As expected, we observe performance improvements when quantization decreases. We select 8-bit quantization and verify that it represents a good trade-off between compression and accuracy. We note how female-specific models are more sensitive to quantization which is a reflection of an original bias of the full precision model.

The results above show that personalized model quantization may be successfully used to bring large ASR transformers on to low-resource devices such as mobile and edge devices with performance targeted for the final end user. The new method which is proposed and which may be termed "myQASR" is a versatile personalized quantization scheme to compress large ASR models to any memory budget. The results for large ASR models show how myQASR improves performance for specific genders, languages, and speakers. As explained in more detail above, myQASR automatically evaluates sensitivity of layers of networks of models to quantization analysing network activations, and uses it to determine the bit depths during quantization. myQASR breaks the common assumption of setting a minimum and a maximum value for the bit depth, and, instead, it relies on a uniformity constraint to guide the quantization process. The uniformity constraint evaluates layer sensitivity in linear time complexity to identify candidate layers that can be further quantized to meet any predefined memory budget constraint to the nearest kilobyte. myQASR couples a uniformity constraint to evaluate layer sensitivity with optional Hessian guidance to set quantization scaling parameters. It requires only a few user-specific unlabelled samples to drive the quantization process personalizing the model performance with no fine-tuning.

myQASR is the first ASR quantization approach that quantizes all parts of the network and supports integer bit shifting operations for matrix multiplication to ease on-device deployment. Integer bit shifting is described for "Ptq4vit: Post-training quantization for vision transformers with twin uniform quantization" by Yuan et al. published in ECCV in 2022. In this paper by constraining the ranges of R1 and R2, there is no need to multiply each half of the activation or weight by each range and bit-shifting can be used instead. When using the two ranges of R1 and R2 in the methods of myQASR described, the constraint as described in the paper is also implemented to align the scaling factor.

Comparing the new method (myQASR) with known methods, we note that myQASR uses detection of layer-wise sensitivity to quantization via a uniformity constraint, relying on small unlabelled training dataset from the end user (this can be considered as an audio profile of the user), with no fine-tuning involved. Previous approaches require labelled datasets and/or fine-tuning. myQASR uses layer-wise sensitivity to drive quantization process efficiently, meeting any target storage requirement and minimizing accuracy degradation for the specific end user. Previous approaches require expensive search of optimal configuration via iterative trial-error methods and can meet only certain average bit depth requirements (but not storage size expressed in MB). Previous approaches do not personalize layer-wise mixed-precision compression to specific users.

myQASR generates quantization of all parts of the networks, and support for integer bit-shifting operations. Previous approaches assume operations are carried on at 32 bits. myQASR has calibration of model weights and activations to improve personalization to the final end user. By contrast, previous approaches do not personalize weights to specific users nor do they personalize activations to specific users, but rather set calibration parameters on global data.

The context of the techniques described above is that users want to use efficient personalized AI models on device without sharing or labelling target data. As AI models get bigger, increasing interest has focused on model compression. Mixed precision model quantization has attracted particular interest, but how to personalize compression for each user is still an open problem. Disadvantages of state-of-the-art solutions in mixed precision quantization include that there is way to account for personalizing the compressed model to work best for the specific end user.

Figure 14:
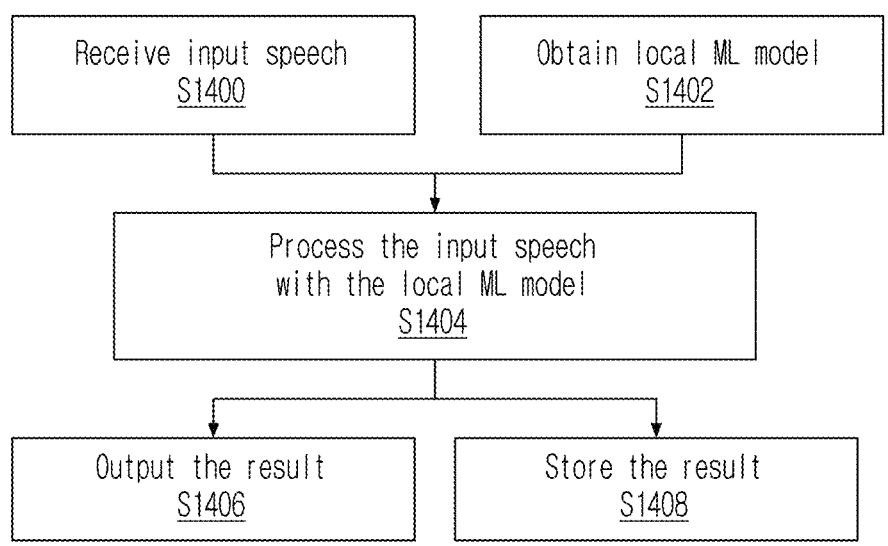
FIG. 14 is a flowchart of applications for using the model trained as described in FIG. 3.

FIGS. 14 to 18 illustrate some uses of a personalised, compressed model which has been generated and stored on a user device as described above. FIG. 14 is a flowchart for generating an output using an automatic speech recognition model. In a first step S1400, input speech is received, for example by a user speaking into a microphone. The next step S1402, which may be done simultaneously with the first step, is to obtain the local ML model from storage on the user device. In this case, the local ML model is an automatic speech recognition model which has been personalised using speech data samples which are local to the user device, e.g. for the user(s) of the device.

As shown at step S1404, the input speech is processed using the model and the result is output at step S1406. The output may be a command which is processed by the user device to change a setting on the user device, e.g. to increase the volume or to activate an application, e.g. to play music. Alternatively, the output may be a transcription of the input speech. Outputting the transcript may comprise outputting a video file which comprises the original speech as audio (either as video or audio file) and the transcript published on screen alongside the original speech. As shown at step S1408, the output may optionally be stored together with the input speech file. The output and input speech file form user data which may be used to personalise the general purpose ASR model as described above.

Before the result is output, there may be an optional stage (not shown) in which a user can approve or disapprove the result. For example, when generating a transcript, the user reads the transcript and can indicate their approval or otherwise using a user interface. When the user can approve the transcript, the transcript is output. Alternatively, when there is no approval, the user manually enters the correct transcript or edits the transcript generated by the model. The manual corrected or entered transcript may then be output as the result of the process.

Figure 15:
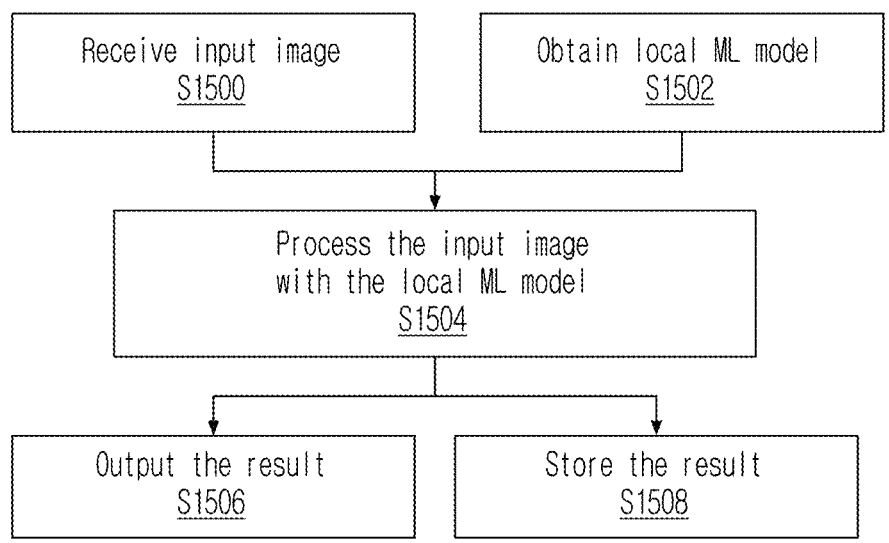
FIG. 15 is a flowchart of applications for using the model trained as described in FIG. 3.

FIG. 15 is a flowchart for processing an input image. In a first step S1500, an input image is received, for example by selection from a library by a user or by a user taking an image. The next step S1502 is to obtain the local ML model from storage on the user device. In this case, the local ML model is an image processing model which has been personalised using image data samples which are local to the user device.

As shown at step S1504, the input image is processed using the obtained local ML model and the result is output at step S1506. In one example, the local ML model may be an image captioning model and the input image may be processed to generate a draft caption for the image. In another example, the local ML model may be an image classification model and the input image may be processed to generate one or more tags/classes for the image. A set of classes may be generated, for example, by also using a segmentation model to segment the image and generating a class tag for each segment. Alternatively, a set of classes may be the output for the image as a whole.

As in FIG. 14, there may be an optional stage in which the user can approve or disapprove the results and edit the results if they are not approved. As shown at step S1508, the output may optionally be stored together with the input image file. The output and input image file form user data which may be used to personalise the general purpose image processing model as described above.

Figure 16:
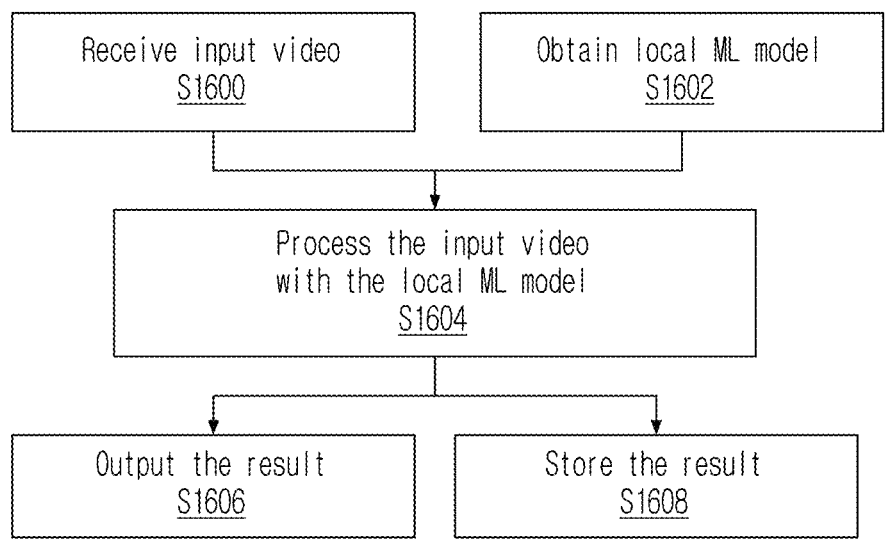
FIG. 16 is a flowchart of applications for using the model trained as described in FIG. 3.

FIG. 16 is a variation on FIG. 15 in which an input video is received at step S1600. The next step S1602 is to obtain the local ML model from storage on the user device. In this case, the local ML model is a video processing model which has been personalised using video data samples which are local to the user device. As shown at step S1604, the input video is processed using the obtained local ML model and the result is output at step S1606. In one example, the local ML model may be a automatic speech recognition model and the input video may be processed to generate captions (or subtitles) for the video. In another example, the local ML model may be a video classification model and the input video may be processed to generate one or more tags/classes for the video. At step S1608, the output may optionally be stored together with the input video file.

Figure 17:
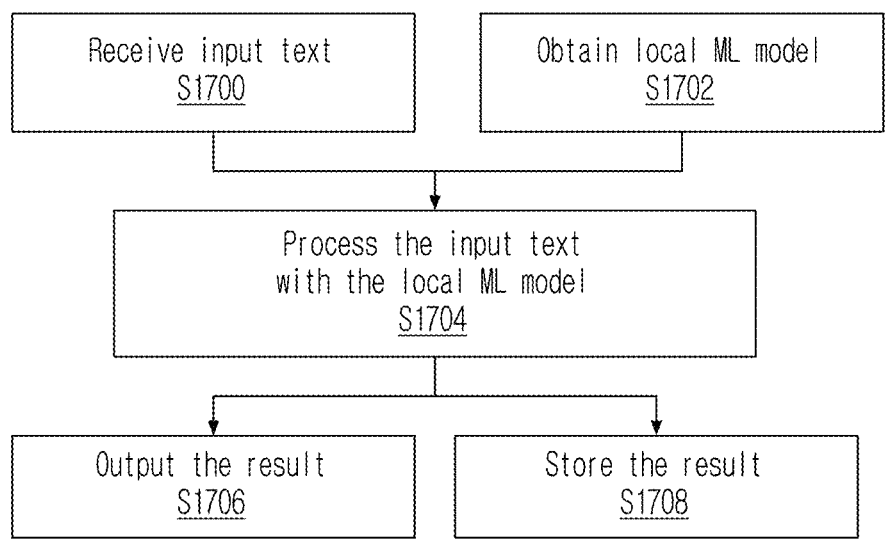
FIG. 17 is a flowchart of applications for using the model trained as described in FIG. 3.

FIG. 17 is a flowchart for processing input text. In a first step S1700, input text is received, for example by a user typing into a user interface. The next step S1702 is to obtain the local ML model from storage on the user device. In this case, the local ML model is a text classification model which has been personalised using text data samples which are local to the user device. As shown at step S1704, the input text is processed using the obtained local ML model and the result is output at step S1706. In one example, the local ML model may be a text classification model and the input text may be processed to generate one or more tags/classes for the text. At step S1708, the output may optionally be stored together with the input text file.

According to one example, the solution described above provides system and methods to perform personalized quantization of massive ASR AI models to any target storage budget. The method automatically detects layer-wise sensitivity to quantization bit depths relying on users' audio profile, that is computed on unlabelled private users' historical data, without requiring any feedback from the user. As an example, the system improves personalization of Bixby ASR during its quantization. There is no need for any labels and with only limited available data and no training required, can meet any target storage/memory budget. The final quantized models show large model size gain with limited WER degradation. The proposed method is agnostic to the choice of the Post Training Quantization (PTQ) method employed. By design, PTQ is performed in mixed precision, and it is aware of and driven by the unseen, unlabelled, limited, private user data, via frequency analyses of such data. Our proposed methods can further include hessian-guided or cosine-guided parameters' calibration, which significantly reduces the error rate.

According to another example, the solution may also provide system and methods to build users' audio profiles via frequency-based statistics of the models' activations on unlabelled, limited, private historical user data. Our system creates implicitly creates users' local profiles for example to improve AI models (e.g. Bixby ASR) during their quantization. For example, for the sake of the experimental validation, we show that our system and methods can personalize multipurpose massive ASR models to genders, speaker ids, and/or language. However, our method makes no a priori distinction. For example, users' devices may contain voices from multiple genders, speakers and languages.

The problem of mixed precision model quantization may be expressed as how to select layer-wise bit depths which is still an open problem. State-of-the-art solutions in mixed precision quantization are based on either hyper-parameter setting or layer-wise sensitivity approaches based on loss computed with forward-backward pass. The disadvantages of such solutions include that sensitive hyper-parameter selection requires hand-crafted tuning and the second approach is computationally expensive and potentially requires some labelled data. According to another example, we provide system and methods to employ the users' audio profiles to detect layer-wise sensitivity of ASR AI models to quantization bit depths.

Our system improves the efficiency of the estimation of the bit depths to compress models (e.g. Bixby ASR); without requiring expensive search as in current systems. We propose a system to identify which layers of a neural network will be more sensitive to compression given a certain frequency input. Our approach can also quantize activations and does not need any labelled data: We start from trained model weights. We analyze the relationship between network activations and input frequency. We quantize weights which have low network activation for specific frequency profiles. Our approach does not need any user feedback. We do not require computation of accuracy or word error rate. We can perform our method in linear time once the new frequency profile is computed (computationally efficient).

The problem of mixed precision model quantization may be expressed as how to fit every model to a given storage budget which is still an open problem. State-of-the-art solutions on mixed precision quantization do not account for a given storage budget constraint, as they generally focus on layer-wise bit depths rather than model size (the two are different since different layers may have a different number of parameters). Additionally, often weights are quantized but activations/operations are not; therefore weights need to be quantized/dequantized at inference time. The disadvantages of such solutions include needing to tweak hyper-parameters until the quantized model respects the budget (expensive search on hyper-parameter space) and increased computational time due to quantization/dequantization procedure to run operations at full precision. According to another example, we provide systems and methods to employ layer-wise sensitivity (as described in the previous example) to identify the variable bit depths and apply a quantization function (i.e., mixed precision quantization) for every layer in the network to reduce model size to any given target budget with smallest possible accuracy drop.

Our system finds automatically which layers of the model (e.g. Bixby ASR) are most sensitive to quantization for a given target storage budget and unlabeled historical data and assigns a higher bit depth to them, so that performance loss is minimized. We thus propose a system and method to estimate the optimal bit depths to employ for quantizing each layer of a deep neural network, on the basis of layer-wise network activations given a frequency profile. We propose a system and methods to exploit the relationship between frequency and network layer activations to produce a list of layer wise bit depths for personalized compression.

For example, we achieve this via a quantization function Q( ) which takes as INPUT: A frequency/activation distribution; and as OUTPUT: layer-wise list of bit depths. Multiple embodiments on the design of Q( ) are described. For example Q( ) can be a single-shot function in which the Mixed Precision quantization bit depths for each layer are obtained via a function of activation distributions. When using the models to process speech, different users produce different frequencies and hence different activation distributions. Thus, the activation distributions may be considered to represent frequency statistics. Alternatively, Q( ) can be found via an iterative procedure. For example, via iterative quantization by means of sampling layer wise activations given a new frequency distribution and quantizing given a set threshold. Q( ) can be found via lookup tables in neural architecture search, via iterative knowledge distillation between original and quantized models (on weights- or activations-related metrics), or via reinforcement learning algorithms. The proposed methods can further be deployed with fully quantized operations, for example, all matrix operations can be quantized, thus avoiding current state-ofthe-art practice of quantizing and de-quantizing to run the operation in full or half precision, quantize again to the desired bit depth.

The present techniques focus on text ASR models, but can be applied to any other model and task.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A computer-implemented method for generating a personalized local machine learning (ML) model data, the method comprising:
   obtaining a general ML model in a form of a neural network comprising a plurality of layers with each layer having a set of general weights;
   obtaining a memory budget for the local ML model;
   obtaining a set of local data samples; and
   for each layer in the plurality of layers of the general ML model:
   detecting a sensitivity of the layer to quantization by applying the general ML model to the set of local data samples;
   determining, using the detected sensitivity of the layer and the obtained memory budget, an optimum bit depth for the corresponding layer in the local ML model, so that the local ML model satisfies the memory budget;
   defining at least one scaling factor for the layer to scale the set of general weights to the optimum bit depth; and
   generating a set of quantized weights by quantizing the set of general weights for the layer using the at least one scaling factor,
   wherein the set of quantized weights for each layer define the personalized local ML model, and
   wherein there are multiple optimum bit depths which satisfy a uniformity constraint.

2. The method of claim 1, wherein the memory budget for the local ML model is between a tenth to a half of a memory budget required to store the general ML model.

3. The method of claim 1, wherein the general ML model is an automatic speech recognition model and the set of local data samples comprise audio data samples.

4. The method of claim 1, wherein detecting the sensitivity of the layer to quantization comprises:
   detecting activation of each layer; and
   calculating, using the detected activation, a statistic which is indicative of the sensitivity of the layer to quantization.

5. The method of claim 4, further comprising:
   determining an optimum bit depth by:
   ranking each layer using the calculated statistic; and
   assigning lower optimum bit depths to the lower ranked layers.

6. The method of any claim 1, wherein determining an optimum bit depth comprises:
   reducing a bit depth of a first layer in the plurality of layers;
   computing a size of the local ML model with the reduced bit depth;
   comparing the calculated size with the memory budget,
   when the calculated size exceeds the memory budget, reducing a bit depth of a subsequent layer in the plurality of layers; and
   repeating the computing, comparing and reducing a bit depth of a subsequent layer until the calculated size meets the memory budget.

7. The method of claim 6, wherein the first layer is the lowest ranked layer and a subsequent layer is a layer which is higher in the ranking.

8. The method of claim 1, wherein defining at least one scaling factor for the layer comprises:
   detecting minimum and maximum values activation of each layer when applying the general ML model to the set of local data samples; and
   defining a scaling factor for each layer using a difference between the minimum and maximum values activation of each layer.

9. The method of claim 8, wherein the scaling factor $S_l$ for each layer is defined by:

$$S_l = (X_l^M - X_l^m)/(2^{b_l - 1})$$

where $X_l^m$ is the minimum activation value for each layer of the full precision model, $X_l^M$ is the maximum activation value for each layer of the full precision model and $b_l$ is the number of bits in the layer.

10. The method of claim 1, wherein there is one scaling factor for each layer and each scaling factor is defined by minimizing a distance between a quantized output from each layer of the local ML model when using a calibration data set and an output from the corresponding layer in the general ML model when using the calibration data set.

11. The method of claim 1, wherein there are two scaling factors for each layer and the two scaling factors are defined using two quantization ranges per layer.

12. The method of claim 11, further comprising:
defining the two scaling factors by performing a linear search using a calibration data set.

13. The method of claim 12, further comprising:
using a Hessian-based calibration optimization in the linear search.

14. A user device for generating a personalized local machine learning (ML) model, wherein the user device is configured to:
- obtain a general ML model in the form of a neural network comprising a plurality of layers with each layer having a set of general weights;
- obtain a memory budget for the local ML model;
- obtain a set of local data samples; and
- for each layer in the plurality of layers of the general ML model:
  - detect, using a sensitivity module, a sensitivity of the layer to quantization by applying the general ML model to the set of local data samples;
  - determine, using the detected sensitivity of the layer to quantization and the obtained memory budget, an optimum bit depth for the corresponding layer in the local ML model, so that the local ML model satisfies the memory budget;
  - define at least one scaling factor for the layer to scale the set of general weights to the optimum bit depth; and
  - generate, using a quantization module, a set of quantized weights by quantizing the set of general weights for the layer using the at least one scaling factor, wherein the set of quantized weights for each layer define the personalized local ML model, and wherein there are multiple optimum bit depths which satisfy a uniformity constraint.

15. A server for generating personalized local machine learning (ML) model data to be used on a user device, wherein the server is configured to:
- train a general ML model in the form of a neural network comprising a plurality of layers with each layer having a set of general weights;
- obtain a memory budget for the local ML model to be stored on the user device;
- obtain a set of local data samples from the user device; and
- for each layer in the plurality of layers of the general ML model:
  - detect, using a sensitivity module, a sensitivity of the layer to quantization by applying the general ML model to the set of local data samples;
  - determine, using the detected sensitivity of the layer to quantization and the obtained memory budget, an optimum bit depth for the corresponding layer in the local ML model, so that the local ML model satisfies the memory budget;
  - define at least one scaling factor for the layer to scale the set of general weights to the optimum bit depth; and
  - generate, using a quantization module, a set of quantized weights by quantizing the set of general weights for the layer using the at least one scaling factor, wherein the set of quantized weights for each layer define the personalized local ML model, and wherein there are multiple optimum bit depths which satisfy a uniformity constraint.

* * * * *